(12) United States Patent
Durkot et al.

(10) Patent No.: US 8,334,067 B2
(45) Date of Patent: Dec. 18, 2012

(54) NON-UNIFORM CONDUCTIVE COATING FOR CATHODE ACTIVE MATERIAL

(75) Inventors: Richard E. Durkot, East Walpole, MA (US); Joseph E. Sunstrom, Merrimack, NH (US); Shelly Van Blarcom, West Newton, MA (US); Robert C. Reeder, Cincinnati, OH (US)

(73) Assignee: The Gillette Company, Boston, MA (US)

( * ) Notice: Subject to any disclaimer, the term of this patent is extended or adjusted under 35 U.S.C. 154(b) by 785 days.

(21) Appl. No.: 12/352,625

(22) Filed: Jan. 13, 2009
(Under 37 CFR 1.47)

(65) Prior Publication Data
US 2010/0178538 A1 Jul. 15, 2010

(51) Int. Cl.
*H01M 4/52* (2010.01)

(52) U.S. Cl. ............ 429/129; 429/3; 429/133; 429/144; 429/406

(58) Field of Classification Search .................. 429/120, 429/329, 221, 231
See application file for complete search history.

(56) References Cited

U.S. PATENT DOCUMENTS

| | | | |
|---|---|---|---|
| 345,124 A | 7/1886 | DeVirloy et al. | |
| 3,893,870 A | 7/1975 | Kozawa | |
| 4,777,100 A | 10/1988 | Chalilpoyil et al. | |
| 5,300,371 A | 4/1994 | Tomantschger et al. | |
| 5,342,712 A | 8/1994 | Mieczkowska et al. | |
| 6,001,504 A | 12/1999 | Batson et al. | |
| 6,114,063 A * | 9/2000 | Katsumoto et al. | 429/223 |
| 6,207,322 B1 | 3/2001 | Kelsey et al. | |
| 6,284,410 B1 | 9/2001 | Durkot et al. | |
| 6,472,103 B1 | 10/2002 | Durkot et al. | |
| 6,492,062 B1 | 12/2002 | Wang et al. | |
| 6,500,576 B1 | 12/2002 | Davis et al. | |
| 6,521,378 B2 | 2/2003 | Durkot et al. | |
| 6,858,349 B1 | 2/2005 | Luo et al. | |
| 7,081,319 B2 | 7/2006 | Christian et al. | |
| 7,247,407 B2 | 7/2007 | Durkot et al. | |
| 7,273,680 B2 | 9/2007 | Durkot et al. | |
| 2002/0172867 A1 | 11/2002 | Anglin | |
| 2003/0039888 A1 * | 2/2003 | Wang et al. | 429/223 |
| 2004/0043292 A1 | 3/2004 | Christian et al. | |
| 2004/0076881 A1 | 4/2004 | Bowden et al. | |
| 2004/0175613 A1 | 9/2004 | Eylem et al. | |
| 2004/0197656 A1 | 10/2004 | Durkot et al. | |
| 2004/0202931 A1 | 10/2004 | Christian et al. | |
| 2004/0237293 A1 | 12/2004 | Durkot et al. | |
| 2005/0058902 A1 | 3/2005 | Wang et al. | |
| 2005/0058903 A1 | 3/2005 | Eylem et al. | |
| 2005/0136328 A1 | 6/2005 | Eylem et al. | |
| 2005/0153204 A1 * | 7/2005 | Fierro et al. | 429/223 |
| 2006/0046135 A1 * | 3/2006 | Huang | 429/128 |
| 2006/0159993 A1 | 7/2006 | Christian et al. | |
| 2008/0008937 A1 | 1/2008 | Eylem et al. | |
| 2009/0263727 A1 * | 10/2009 | Josephs et al. | 429/329 |
| 2009/0305137 A1 * | 12/2009 | Anglin et al. | 429/224 |

FOREIGN PATENT DOCUMENTS

| | | |
|---|---|---|
| CA | 1263697 | 12/1989 |
| JP | 10 021902 | 1/1998 |
| WO | WO 2005/048383 | 5/2005 |

OTHER PUBLICATIONS

U.S. Appl. No. 10/675,512, filed Sep. 30, 2003, Berkowitz et al.
Liu, et al., "DSC Characterisation of Chemically Reduced Electrolytic Manganese Dioxide," J. Thermal Analysis and Calorimetry, 88(1):177-180, 2007.
Deabate et al., Structural and Electrochemical Characterization of Nickel Hydroxide Obtained by the New Synthesis Route of Electrodialysis. A Comparison with Sperical $\beta$-Ni(OH)$_2$, Ionics, 5:371-384, 1999.
Fu et al. "$\beta$-CoOOH coated spherical $\beta$-NiOOH as the positive electrode material for alkaline Zn-niOOH battery," J. Power Sources, 164(2):916-920, 2007.
David Linden, Handbook of Batteries (McGraw-Hill, 2d ed. 1995), 1.9-23.12.
Falk & Salkind, "Alkaline Storage Batteries," John Wiley & Sons, Inc. (New York, NY), 1969, pp. 1-41.

* cited by examiner

*Primary Examiner* — Melvin C Mayes
*Assistant Examiner* — Colette Nguyen
(74) *Attorney, Agent, or Firm* — Fish & Richardson P.C.

(57) ABSTRACT

Cathodes that include an active cathode material are described. The active cathode material can be coated.

13 Claims, 12 Drawing Sheets

NON-UNIFORM CONDUCTIVE COATING FOR CATHODE ACTIVE MATERIAL

TECHNICAL FIELD

The invention relates to batteries, and to related components and methods.

BACKGROUND

Batteries, such as alkaline batteries, are commonly used as electrical energy sources. Generally, a battery contains a negative electrode (anode) and a positive electrode (cathode). The anode contains an active material (e.g., zinc particles) that can be oxidized; and the cathode contains an active material (e.g., manganese dioxide) that can be reduced. The active material of the anode is capable of reducing the active material of the cathode. In order to prevent direct reaction of the active material of the anode and the active material of the cathode, the electrodes are electrically isolated from each other by a separator.

When a battery is used as an electrical energy source in a device, such as a cellular telephone, electrical contact is made to the electrodes, allowing electrons to flow through the device and permitting the respective oxidation and reduction reactions to occur to provide electrical power. An electrolyte in contact with the electrodes contains ions that flow through the separator between the electrodes to maintain charge balance throughout the battery during discharge.

SUMMARY

The invention relates to batteries, and to related components and methods. The batteries include a cathode active material having a non-uniform coating. The non-uniformly coated cathode active material can have relatively high moisture (e.g., water) content. Surprisingly, one or more of these cathode active material characteristics can improve performance of the cathode active material relative to a uniformly coated cathode material and/or a cathode material having relatively low moisture content. During synthesis of the cathode active material, a slow addition of an alkali hydroxide can further provide a cathode active material having improved performance. For example, in some embodiments, a battery performance improvement of 50% to 110% (e.g., 60% to 100%, 50% to 100%, 50% to 90%, 50% to 70%, or 50% to 60%) in a digital camera test can be observed for a non-uniformly coated cathode active material, when compared with a fully-coated commercially available material.

In one aspect, the invention features a battery including a cathode including a cathode active material. The cathode active material includes a coated nickel oxyhydroxide having a coated surface area of at most 50 percent and a resistivity of at least four ohm centimeters; an anode; a separator; and an electrolyte.

In another aspect, the invention features a cathode including a cobalt oxyhydroxide-coated nickel oxyhydroxide having a powder resistivity to cobalt coating percentage ratio of between 24 ohm centimeter/percent cobalt by weight and 2 ohm centimeter/percent cobalt by weight.

In yet another aspect, the invention features a method of making a cathode active material, including obtaining a mixture of nickel hydroxide, cobalt sulfate, and sodium persulfate; adding an alkali hydroxide at a rate of at most two mol percent per minute relative to nickel hydroxide, and isolating a cobalt oxyhydroxide-coated nickel oxyhydroxide.

In a further aspect, the invention features a method including discharging, only once, a primary electrochemical cell including a cathode including a cathode active material. The cathode active material includes a coated nickel oxyhydroxide having a coated surface area of at most 60 percent and a resistivity of at least four ohm centimeters; an anode; a separator; an electrolyte; and disposing the cell without recharging the cell.

Embodiments can include one or more of the following features.

In some embodiments, the coated nickel oxyhydroxide has an uncoated surface area of at least 50 percent. The coated nickel oxyhydroxide can have a moisture content of between 4 percent and 7 percent (e.g., between 5 percent and 5.7 percent).

In some embodiments, the coated nickel oxyhydroxide is coated with cobalt oxyhydroxide. The coated nickel oxyhydroxide can have a cobalt oxyhydroxide coating of at most three percent by weight. In some embodiments, the cobalt oxyhydroxide-coating has a cobalt content of between 2.0 percent and 2.5 percent by weight relative to the cobalt oxyhydroxide-coated nickel hydroxide.

In some embodiments, the cathode further includes a cathode active material such as manganese dioxide (e.g., electrolytic manganese oxide), silver oxide, silver nickelate, silver copper oxide, silver permanganate, barium permanganate, barium manganate, and/or barium ferrate.

In some embodiments, the coated nickel oxyhydroxide has a powder resistivity of between 15 ohm centimeters and four ohm centimeters. The coated nickel oxyhydroxide can have a high rate discharge (or simulated digital camera) efficiency of between 59% and 69.6%. The cobalt oxyhydroxide-coated nickel hydroxide can be assembled into a battery. The battery when discharged can provide at least 250-280 pulses at 1.05V and/or at most 380 pulses at 1.05V. The battery can be a AA battery.

In some embodiments, the anode includes an anode active material, and a molar ratio of the cathode active material to the anode active material is at least one. The anode can include zinc.

In some embodiments, the alkali hydroxide is lithium hydroxide, sodium hydroxide, and/or potassium hydroxide. The method can further include drying the cobalt oxyhydroxide-coated nickel oxyhydroxide to a moisture content level of between 5 and 5.7 percent.

Embodiments can include one or more of the following advantages.

In some embodiments, a battery performance improvement of 50% to 110% (e.g., 60% to 100%, 50% to 100%, 50% to 90%, 50% to 70%, or 50% to 60%) in a digital camera test can be observed for a non-uniformly coated NiOOH, when compared with a fully-coated commercially available material. In some embodiments, a battery performance improvement of at least 50% (e.g., at least 60%, at least 70%, at least 90%, or at most 100%) and/or at most 110% (e.g., at most 100%, at most 90%, at most 70%, or at most 60%) in a digital camera test can be observed for a non-uniformly coated NiOOH of the present disclosure, when compared with a fully-coated commercially available material.

In some embodiments, a non-uniform coating reduces side reactions with a battery electrolyte and/or can increase the particle's conductivity. The non-uniform coating on particles of cathode active material can increase the connectivity between particles, while the exposed and open surfaces on the particles provide relatively unhindered discharge. In some embodiments, a non-uniform coating increases a high rate capacity delivery which can be retained even with exposure to high temperature storage over an extended period of time.

In some embodiments, the non-uniformly coated cathode active material includes agglomerated particles, such that two or more particles are joined by a coating on the surface of the particles. The agglomeration can increase connectivity between the particles and can increase high rate capacity delivery.

In some embodiment, a relatively elevated water level can increase digital camera performance. For example, in some embodiments, a water content of between five and 5.7 percent by weight can increase the digital camera performance of a cathode active material by about ten to 15 percent.

In some embodiments, a synergistic effect can occur as a result of the combined effects of the non-uniform coating and the water content in a cathode active material, such that the increase in performance resulting from the combined effects is greater than the cumulative increase in performance resulting from each individual effect.

In some embodiments, the cathode active material has a high rate discharge efficiency of at least 55 percent (e.g., at least 57 percent, at least 60 percent, or at least 65 percent) and/or at most 70 percent (e.g., at most 65 percent, at most 60 percent, at most 57 percent) of the theoretical volumetric capacity.

In some embodiments, during a synthesis of the cathode active material, a slow addition of alkali hydroxide (e.g., sodium hydroxide, potassium hydroxide, lithium hydroxide) results in a cathode active material having improved performance (e.g., digital camera performance).

The details of one or more embodiments of the invention are set forth in the accompanying drawings and the description below. Other features, objects, and advantages of the invention will be apparent from the description and drawings, and from the claims.

DETAILED DESCRIPTION

Figure 1:
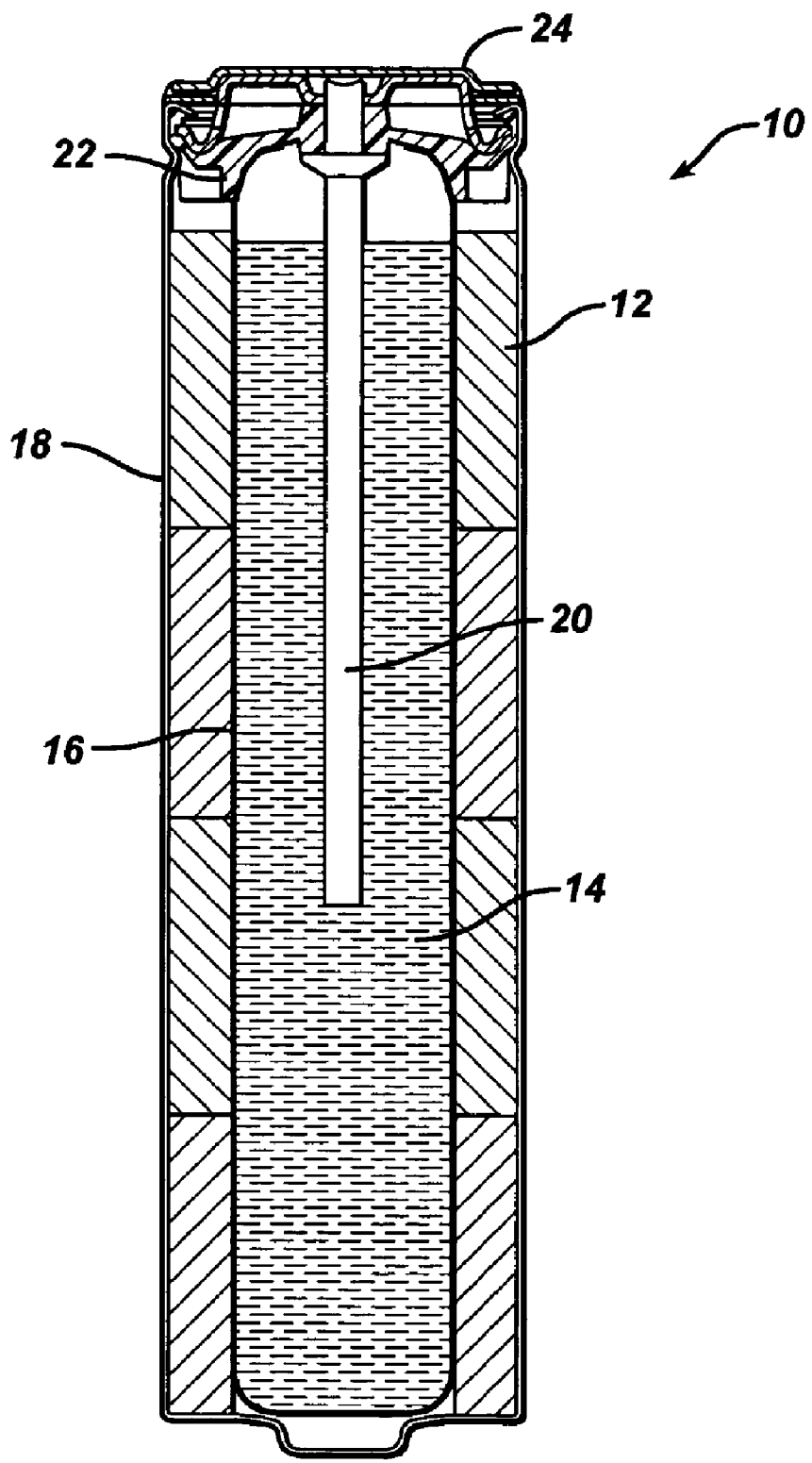
FIG. 1 is a cross-sectional view of an embodiment of a battery.

Referring to FIG. 1, a battery or electrochemical cell 10 has a cylindrical housing 18 containing a cathode 12, an anode 14, a separator 16 between cathode 12 and anode 14, and a current collector 20. Cathode 12 includes a cathode active material, and anode 14 includes an anode active material. Battery 10 also includes a seal 22 and a metal top cap 24, which, along with current collector 20, serve as the negative terminal for the battery. Cathode 12 is in contact with housing 18, and the positive terminal of battery 10 is at the end of the battery opposite from the negative terminal. An electrolyte is dispersed throughout battery 10.

Cathode 12 includes one or more coated cathode active material, one or more electrically conductive additives; and optionally, a binder. Examples of cathode active materials include cathode active materials that include nickel, such as a nickel oxyhydroxide (NiOOH). The nickel oxyhydroxide can include, for example, a beta-nickel oxyhydroxide, a gamma-nickel oxyhydroxide, and/or a solid solution of a beta-nickel oxyhydroxide and a gamma-nickel oxyhydroxide.

In some embodiments, the cathode active material includes a manganese oxide, such as manganese dioxide ($MnO_2$). The manganese dioxide can be electrolytically-synthesized $MnO_2$ (EMD), chemically-synthesized $MnO_2$ (CMD), or a blend of EMD and CMD. Distributors of manganese dioxides include Kerr-McGee Corp. (manufacturer of, e.g., Trona D and high-power EMD), Tosoh Corp., Delta Manganese, Delta EMD Ltd., Mitsui Chemicals, ERACHEM, and JMC. In certain embodiments, cathode 12 can include from about 80% to about 88% by weight (e.g., from about 82% to about 86% by weight) manganese dioxide (e.g., EMD).

Other examples of cathode active materials include copper oxides (e.g., cupric oxide (CuO), cuprous oxide ($Cu_2O$)); copper hydroxides (e.g., cupric hydroxide ($Cu(OH)_2$), cuprous hydroxide (Cu(OH))); cupric iodate ($Cu(IO_3)_2$); $AgCuO_2$; $LiCuO_2$; $Cu(OH)(IO_3)$; $Cu_2H(IO_6)$; copper-containing metal oxides or chalcogenides; copper halides (e.g., $CuCl_2$); and/or copper manganese oxides (e.g., $Cu(MnO_4)_2$). The copper oxides can be stoichiometric (e.g., CuO) or non-stoichiometric (e.g., $CuO_x$, where $0.5 \leq x \leq 1.5$). Another example of a cathode active material is $Cu_6InO_8Cl$.

Additional examples of cathode active materials include cathode active materials including a pentavalent bismuth-containing metal oxide.

In certain embodiments, cathode 12 can be porous. A porous cathode can include, for example, one or more of the above-described cathode active materials (e.g., EMD, NiOOH).

The cathode active material can be in the shape of particles. Each particle can be coated with an amount of a protective surface coating. The coating can help reduce side reactions with battery electrolyte and/or can increase the particle's conductivity. The protective surface coating can include cobalt oxyhydroxide, tri-cobalt tetraoxide, cobalt hydroxide carbonate and/or cobalt hydroxide.

In contrast to conventional uniform coatings, the protective coating on the particles of cathode active material can be non-uniform. In some embodiments, the non-uniform coating on the particles increases the connectivity between particles, while the exposed and open surfaces on the particles provide relatively unhindered discharge. Conventionally, it is believed that fully coating the surface of a particle can protect the particle from exposure to battery electrolyte and can insulate the particle from self discharge through contact with electrolyte. In particular, it is believed that the cathode active material can self-protect with time, and can acquire, for example, an insulating layer of $Ni(OH)_2$, which can provide a longer lifetime for the cathode active material and protect the material from self-discharge. Surprisingly, however, it is observed that a non-uniform coating instead provides improved high rate capacity delivery which can be retained even with exposure to high temperature storage over an extended period of time.

In some embodiments, the particles of cathode active material have an average amount of a transition metal (e.g., Co, Ni, Zn) in the non-uniform coating. The average amount of a transition metal of a population of particles can be at most three percent (e.g., at most 2.5 percent, at most two percent, or at most about one percent) and/or at least 0.5 percent (e.g., at least one percent, at least two percent, or at least 2.5 percent) by weight relative to the weight of the population of particles. The non-uniform coating can form areas on the particle having relatively thick protrusions of a coating material, while other areas on the particle can have a relatively thin layer of the coating material or can be substantially free of the coating material.

In some embodiments, the particles are agglomerated, such that two or more particles are joined by a coating on the surface the particles to form clusters of particles. The particle agglomeration can increase connectivity between the particles and can provide an increased high rate capacity delivery. A particle size analyzer (e.g., Sympatec Gmbh laser diffraction particle size analyzer) can be used to measure the agglomeration of particles and/or the average size of the coated particles or particle clusters. During measurement, an amount of particles can be added to a solution to provide a suspension, and the particle concentration can be adjusted such that about 20% of a laser light is blocked from a detector in the particle size analyzer. Using light scattering techniques, the average size distribution of the particle or particle clusters can be determined.

The particles can have an average coated surface area of at most 50 percent (e.g., at most 40 percent, at most 30 percent, at most 20 percent, or at most 10 percent) and/or at least five percent (e.g., at least 10 percent, at least 20 percent, at least 30 percent, or at least 40 percent) of the total average particle surface area. In some embodiments, the particles can have an average exposed surface area of at least 50 percent (e.g., at least 60 percent, at least 70 percent, at least 80 percent, or at least 90 percent) and/or at most 99 percent (e.g., at most 90 percent, at most 80 percent, at most 70 percent, or at most 60 percent).

In some embodiments, particle imaging to determine the size and percent coverage of a given particle can be carried out with a scanning electron microscope (SEM), such as a Hitachi S-5200 SEM/STEM, using 3 kV applied tube voltage and 20 microamp tip current. For example, a number of particles can be selected at random and imaged at 5,000× (e.g., 3,000×, 2,000×, or 1,000×) magnification. The maximum diameter of each particle can be measured with a digital ruler and the percentage area of the coated regions can be determined. For example, about 60% of a measured diameter can be selected at the center of a particle to decrease edge variations that may be due to the base particle morphology. The surface deposits can then be manually selected by outlining the deposits with a lasso tool (for example, in Adobe Photoshop®), the selected coated area can be colored black and the uncoated area can be colored white using the software, and the coverage area can be calculated as a percent of the total particle area using a software tool (e.g., Fovea Pro, by Reindeer Graphics). In some embodiments, energy dispersive spectroscopy measurements can establish the composition of the coated areas and the uncoated areas of a particle surface.

In some embodiments, the particles of the cathode active material can have a resistivity of at most 15 ohm centimeters (e.g., at most ten ohm centimeters, at most eight ohm centimeters, or at most four ohm centimeters) and/or at least four ohm centimeters (e.g., at least five ohm centimeters, at least eight ohm centimeters, or at least ten ohm centimeters). For example, the particles of the cathode active material can have a resistivity of between 13.2 and 4.7 ohm centimeters. For example, in some embodiments, a cathode active material having a coating cobalt content of about two weight percent has a resistivity of about six ohm centimeters, and an cathode active material having a cobalt content of about 2.4 percent in a non-uniform coating has a resistivity value of about five ohm centimeters. The apparent resistivity of the particles is measured by compacting the powder under 5000 lbs of force between two electrode surfaces (0.704 $cm^2$). The actual resistance across the compacted particles is then measured with a precision impedance meter (e.g., Quadtech 7400 model B impedance meter) using a 1 volt 2.5 KHz applied AC signal. The actual resistance is converted to apparent resistivity by multiplying by the area of the piston shaped electrode and dividing by the distance between the electrodes at 5000 pounds applied force.

In some embodiments, the resistivity of a coated cathode active material is evaluated by observing the polarization of the cell with depth of discharge. For example, when the voltage of the cell before a load is applied is compared to the voltage at instant the load is applied during discharge, a measure of the pure resistance of the cell can be obtained. A rapid drop in voltage can be measured with an oscilloscope, or can be inferred from a discharge curve. Without wishing to be bound by theory, it is believed that this measurement is highly related to the resistivity of the material as a function of the degree of consumption. In some embodiments, at a similar degree of consumption (e.g., about 2 hours), the polarization of the non-uniformly coated material is about ½ to ⅓ of a commercial fully coated nickel oxyhydroxide. A reduction in polarization (e.g., voltage drop) can increase battery life.

In some embodiments, a battery can include particles having a low resistivity and/or can maintain a low resistivity between particles during discharge. Without wishing to be bound by theory, it is believed that pure fully charged NiOOH particles can increase in resistivity from about 5.0 ohm-cm to $4.0 \times 10^6$ ohm-cm when completely discharged. It is believed that maintaining electrically conductive paths in an active material matrix can provide a more efficient discharge, and that forming conductive bridging clusters of non-uniformly coated particles (e.g., particles that contact one another or that are fused to one another) instead of uniformly coated dispersed conductive particles can lead to lower resistivity and improved utilization.

The particles of cathode active material can further include an amount of water (e.g., moisture). Conventionally, the water content of a cathode active material (e.g., nickel oxyhydroxide) is kept to below one or two percent by weight to, for example, facilitate handling (e.g., by decreasing the likelihood of compaction). Surprisingly, it is observed that a relatively elevated water level can increase digital camera performance. For example, in some embodiments, a water content of between five and 5.7 percent by weight can increase the digital camera performance of a cathode active material by about ten to 15 percent (e.g., about ten to 14 percent, about 12 to 15 percent, about 14 percent, or about 13.7 percent), relative to a standard of 319 pictures. However, above a certain threshold of moisture level, the battery performance can decrease. Without wishing to be bound by theory, it is believed that such a performance decrease is due to water (density of 1 g/ml) replacing NiOOH (density of 4.1 g/ml) in the cathode at a volume ratio of about 1:4, and that the replacement reduces the amount of NiOOH to a level that the cathode active material can no longer support the demands of discharge.

In some embodiments, the water content of the cathode active material is at least four percent by weight (e.g., at least five percent by weight or at least six percent by weight) and/or at most seven percent by weight (e.g., at most six percent by weight or at most five percent by weight). For example, the water content can be between four and seven percent by weight (e.g., between five and six percent by weight, between four and six percent by weight, between four and five percent by weight, or between five and 5.7 percent by weight). Without wishing to be bound by theory, it is believed that a water is a medium for ionic communication and is consumed by the cathode during discharge. In some embodiments, it is believed that a fully hydrated cathode can include the involvement of all the electrode surface area during discharge, which can reduce local demand on a cathode material and help deliver maximum utilization.

In some embodiments, a cathode active material has both a non-uniform coating and a relatively elevated water content. A synergistic effect can occur as a result of the combined non-uniform coating and the water content. Synergistic effects are described, for example, in Deabate S., Fourgeot, F., Henn, F., (1999) Ionics, vol. 5, 371-384.

In some embodiments, the cathode active material has a high rate discharge efficiency of between 55 and 75 percent (e.g., between 55 and 75 percent, between 57 and 70 percent, between 59 and 70 percent, or between 59% and 69.6%) of a theoretical volumetric capacity. In some embodiments, the cathode active material has a high rate discharge efficiency of at least 55 percent (e.g., at least 57 percent, at least 60 percent, or at least 65 percent) and/or at most 70 percent (e.g., at most 65 percent, at most 60 percent, at most 57 percent) of the theoretical volumetric capacity. As used herein, a high rate discharge efficiency (e.g., percent utilization) is defined as the discharge capacity (measured in amp-hours for a simulated digital camera test) divided by the theoretical capacity. The theoretical capacity is the total weight of pure nickel oxyhydroxide in the battery multiplied by the intrinsic electrochemical equivalent capacity (at 1-electron=0.292 ahrs/g, obtained by multiplying Faraday's number 96485 amp-sec/mole or 26.8 amp-hrs/mole by the number of electrons exchanged, divided by the gram equivalent weight (g) of nickel oxyhydroxide). The actual capacity is calculated by integrating an applied current over an interval of time required to reach a termination voltage of 1.05 volts (in the case of a digital camera simulated test).

In some embodiments, a non-uniformly coated cathode active material, such as a non-uniformly cobalt-coated nickel oxyhydroxide, is made by stirring a starting material such as nickel hydroxide in warm water (e.g., about 45° C., about 40° C., or about 35° C.), followed by adding cobalt sulfate and sodium persulfate. A first portion of alkali hydroxide (e.g., sodium hydroxide, potassium hydroxide, and/or lithium hydroxide) can be slowly added, then a second portion can be slowly added as the temperature of the solution is cooled (e.g., to about 25° C., to about 20° C.). After the alkali hydroxide is fully added, the solution can be heated (e.g., to about 50° C., to about 55° C., to about 60° C., to about 65° C.) and the reaction mixture can be stirred (e.g., for about six hours, for about 12 hours, for about 24 hours, or for about 48 hours) until completion of the reaction. The reaction mixture can include at least one mole of nickel hydroxide.

In some embodiments, for each mole of nickel hydroxide, the reaction mixture includes between 0.91 and 0.99 mole (e.g., at least 0.91 mole, at least 0.93 mole, or at least 0.95 mole and/or at most 0.99 mole, at most 0.95 mole, or at most 0.93 mole) of potassium or sodium peroxydisulfite. The reaction mixture can include between 2.1 and 2.3 moles of an alkali hydroxide. The reaction mixture can include between 0.04 and 0.07 mole (e.g., at least 0.04 mole or at least 0.05 mole and/or at most 0.07 mole or at most 0.06 mole) of cobalt sulfate. In some embodiments, the reaction mixture can include about 51 moles of water.

In some embodiments, following the completion of the reaction, the coated nickel oxyhydroxide is washed multiple times (e.g., three times, four times, or five times) with copious amounts (e.g., four liters, six liters, or eight liters) of fresh deionized water. During each wash the reactor can be heated to about 50° C. with stirring. The stirring can then be turned off and the product can be allowed to settle. The free liquid can be pumped out or decanted to leave a concentrated suspension. This process can be repeated until a sample of the clarified wash liquid no longer produces a precipitate when 10% aqueous $BaCl_2$ solution is added dropwise. Then the concentrated suspension can be pumped into a tray where it can be carefully dried to a desired moisture level in a oven at an elevated temperature (e.g., 40° C., 50° C., 60° C., or 70° C.).

In some embodiments, a slow addition of alkali hydroxide can result in a cathode active material having improved performance. For example, a first portion of alkali hydroxide can be added at a rate of at most three grams per minute (e.g., at most two grams per minute or at most one gram per minute) and/or at least 0.2 gram per minute (e.g., at least one gram per minute or at least two grams per minute). In some embodiments, a second portion of alkali hydroxide can be added at a rate of at most five grams per minute (e.g., at most four grams per minute, or at most three grams per minute). In some embodiments, alkali hydroxide is added at a rate of at most two mole percent (e.g., at most 1.5 mole percent, at most one mole percent, or at most 0.5 mole percent) and/or at least 0.2 mole percent (e.g., at least 0.5 mole percent, at least one mole percent, or at least 1.5 mole percent) relative to the transition metal-containing starting material (e.g., a transition metal hydroxide, such as $Ni(OH)_2$)).

In some embodiments, drying the coated cathode active material can occur at two different temperatures. Without wishing to be bound by theory, it is believed that at a lower drying temperature of 25-50° C. (e.g., 30-50° C., or 30-40° C.), water is lost from th surface of the coated cathode active material. At a higher drying temperature of 50-120° C. (e.g., 60-110° C., 60-100° C., 70-100° C., or 80-100° C.), it is believed that water is lost from the interior of the cathode active material (e.g., a coated particle). At various total moisture levels, the amount of interior moisture can remain relatively constant (e.g., about one percent, about two percent, about three percent), and the surface moisture can increase as total moisture content increases in the cathode active material. The moisture content of the cathode active material can be measured using thermal gravimetric analysis (TGA), where heat is used to evaporate the water content of a sample while recording the weight of the sample over time.

In some embodiments, the cathode active material is incorporated into a battery. The battery can be subjected to a digital cameral test to measure a high rate capacity. The discharge capacity of a battery cathode can be measured, for example, by discharging the battery using a test that simulates consumer use with a digital camera. For example, a 1500 mW load can be applied to the battery for 2 seconds followed by a 650 mW load held for 28 seconds. This cycle can be repeated 10 times or for a total of 5 minutes, then the battery is allowed to rest for 55 minutes. This 60 minute cycle can be repeated and continued until the battery load voltage first reaches 1.05V. A Maccor 2300 battery test system can be used to perform the consumer use simulation where 6-8 AA cells were tested for each experimental test group. The discharge capacity of the cathode is then calculated. In some embodiments, the cathode active material is assembled into a AA cell having a can volume of 6.27 ml. In some embodiments, the cells can have a discharge capacity of at least 380 digital camera pictures (e.g., at least 360 pictures, at least 350 pictures, at least 340 pictures, at least 320 pictures, at least 300 pictures) at 1.05V.

In some embodiments, the cathode active material can further include an uncoated active material. Examples of uncoated cathode active materials include any of the cathode active materials mentioned above. In some embodiments, uncoated cathode active materials can include silver(I) oxide ($Ag_2O$), silver(II) oxide (AgO), silver copper oxide ($AgCuO_2$), silver nickelate ($AgNiO_2$), silver permanganate ($AgMnO_4$), barium permanganate ($Ba(MnO_4)_2$), barium manganate ($BaMnO_4$), and/or barium ferrate ($BaFeO_4$).

In some embodiments, the cathode active material can include a conductive aid. The conductive aid can increase the electronic conductivity of cathode 12. An example of a conductive aid is carbon particles. The carbon particles can be any of the conventional carbon particles used in cathodes. The carbon particles can be, for example, graphite particles. Graphite particles that are used in cathode 12 can be any of the graphite particles used in cathodes. The particles can be synthetic, non-synthetic, or a blend of synthetic and non-synthetic, and they can be expanded or non-expanded. In certain embodiments, the graphite particles are non-synthetic, non-expanded graphite particles. In such embodiments, the graphite particles can have an average particle size of less than about 20 microns (e.g., from about 2 microns to about 12 microns, from about 5 microns to about 9 microns), as measured using a Sympatec HELOS Particle Size Analyzer. Graphite particles can be obtained from, for example, Brazilian Nacional de Grafite (Itapecirica, MG Brazil (MP-0702X)) or Chuetsu Graphite Works, Ltd. (Chuetsu grades WH-20A and WH-20AF) of Japan. Cathode 12 can include, for example, from about 3% to about 9% (e.g., from about 4% to about 7%) carbon particles by weight. In some embodiments, cathode 12 can include from about 4% to about 9% (e.g., from about 4% to about 6.5%) graphite particles by weight.

Another example of a conductive aid is carbon fibers, such as those described in Luo et al., U.S. Pat. No. 6,858,349, and in Anglin, U.S. Patent Application Publication No. US 2002/0172867 A1, published on Nov. 21, 2002, and entitled "Battery Cathode". In some embodiments, cathode 12 can include at most about 2% by weight (e.g., at most about 1.5% by weight, at most about 1% by weight, at most about 0.75% by weight, at most about 0.5% by weight, at most about 0.45% by weight, at most about 0.4% by weight, at most about 0.3% by weight, at most about 0.2% by weight), and/or at least about 0.1% by weight (e.g., at least about 0.2% by weight, at least about 0.3% by weight, at least about 0.4% by weight, at least about 0.45% by weight, at least about 0.5% by weight, at least about 0.75% by weight, at least about 1% by weight, at least about 1.5% by weight) carbon fibers.

In certain embodiments, cathode 12 can include from about 1% by weight to about 10% by weight of one or more total conductive aids.

Examples of binders include polyethylene powders, polyacrylamides, Portland cement and fluorocarbon resins, such as polyvinylidenefluoride (PVDF) and polytetrafluoroethylene (PTFE). An example of a polyethylene binder is sold under the trade name Coathylene HA-1681 (available from Hoechst). Cathode 12 may include, for example, up to about 2% binder by weight (e.g., up to about 1% binder by weight). In certain embodiments, cathode 12 can include from about 0.1% to about 2% (e.g., from about 0.1% to about 1%) binder by weight.

Cathode 12 can include other additives. Additives are disclosed, for example, in Mieczkowska et al., U.S. Pat. No. 5,342,712. In some embodiments, cathode 12 can include titanium dioxide ($TiO_2$). In certain embodiments, cathode 12 can include from about 0.1% to about 2% (e.g., from about 0.2% to about 2%) $TiO_2$ by weight.

Cathodes (e.g., cathode active materials) are described, for example, in Durkot et al., U.S. Patent Application Publication No. US 2004/0237293 A1, published on Dec. 2, 2004, and entitled "Alkaline Cell With Flat Housing and Nickel Oxyhydroxide Cathode"; Durkot et al., U.S. Patent Application Publication No. US 2004/0197656 A1, published on Oct. 7, 2004, and entitled "Alkaline Battery Including Nickel Oxyhydroxide Cathode and Zinc Anode"; Bowden et al., U.S. Patent Application Publication No. US 2004/0076881 A1, published on Apr. 22, 2004, and entitled "Method of Making a Battery"; Eylem et al., U.S. Patent Application Publication No. US 2005/0136328 A1, published on Jun. 23, 2005, and entitled "Battery Cathode"; Eylem et al, U.S. Patent Application Publication No. U.S. 2008/0008937, published Jan. 10, 2008, and entitled "Primary Alkaline Battery Containing Bismuth Metal Oxide"; Al Christian et al., U.S. Patent Application Publication No. US 2004/0043292 A1, published on Mar. 4, 2004, and entitled "Alkaline Battery Including Nickel Oxyhydroxide Cathode and Zinc Anode"; Christian et al., U.S. Patent Application Publication No. US 2004/0202931 A1, published on Oct. 14, 2004, and entitled "Preparation of Nickel Oxyhydroxide"; Eylem et al., U.S. Patent Application Publication No. US 2005/0058903 A1, published on Mar. 17, 2005, and entitled "Primary Alkaline Battery Containing Bismuth Metal Oxide"; Wang et al., U.S. Patent Application Publication No. US 2005/0058902 A1, published on Mar. 17, 2005, and entitled "Primary Alkaline Battery Containing Bismuth Metal Oxide"; and Kelsey et al., U.S. Pat. No. 6,207,322.

A cathode can be made by coating a cathode material onto a current collector, and drying and then calendering the coated current collector. The cathode material can be prepared by mixing the cathode active material together with other components, such as the binder, solvent/water, and the carbon source. For example, a cathode active material such as NiOOH may be combined with carbon (e.g., graphite, acetylene black), and mixed with small amount of water to form a cathode slurry. A current collector can then be coated with the cathode slurry to form the cathode.

Anode 14 can be formed of any of the standard zinc-based materials used in alkaline battery anodes. For example, anode 14 can be a gel that includes zinc metal particles and/or zinc alloy particles, a gelling agent, and minor amounts of additives, such as a gassing inhibitor. The zinc alloy can include zinc (Zn) and at least one of the following elements: indium (In), bismuth (Bi), aluminum (Al), calcium (Ca), lead (Pb), gallium (Ga), lithium (Li), magnesium (Mg), and tin (Sn). In some embodiments, the zinc alloy can include iron (Fe). The iron can, for example, be present as an impurity in the zinc. A portion of the electrolyte solution can be dispersed throughout the anode.

The zinc particles can be any of the zinc-based particles used in gelled zinc anodes. The zinc-based particles can be formed of a zinc-based material, for example, zinc or a zinc alloy. The zinc alloy typically is composed primarily of zinc and can include indium and/or bismuth. Examples of zinc-based particles include those described in U.S. Pat. Nos. 6,284,410; 6,472,103; 6,521,378; and commonly-assigned U.S. application Ser. No. 11/001,693, filed Dec. 1, 2004, all hereby incorporated by reference. The anode may include, for example, by weight between about 60% and about 80%, between about 62% and 75%, between about 62% and about 72%, or between about 67% and about 71% of zinc-based particles. The anode can include less than about 68 percent, 64 percent, 60 percent, 55 percent or 45 percent by weight zinc-based particles.

The zinc-based particles can be formed by various spun or air blown processes. The zinc-based particles can be spherical or non-spherical in shape. Non-spherical particles can be acicular in shape (i.e., having a length along a major axis at least two times a length along a minor axis) or flake-like in shape (i.e., having a thickness not more than 20% of the length of the maximum linear dimension). The surfaces of the zinc-based particles can be smooth or rough. As used herein, a "zinc-based particle" refers to a single or primary particle of a zinc-based material rather than an agglomeration or aggregation of more than one particle. A percentage of the zinc-based particles can be zinc fines. As used herein, zinc fines include zinc-based particles small enough to pass through a 200 mesh size sieve (i.e., a sieve having square openings of 0.075 mm on a side) during a normal sieving operation (i.e., with the sieve shaken manually). Zinc fines capable of passing through a 200 mesh sieve can have a mean average particle size from about 1 to 75 microns, for example, about 75 microns. The percentage of zinc fines (i.e., −200 mesh) can make up about 10 percent, 25 percent, 50 percent, 75 percent, 80 percent, 90 percent, 95 percent, 99 percent or 100 percent by weight of the total zinc-based particles. A percentage of the zinc-based particles can be zinc dust small enough to pass through a 325 mesh size sieve (i.e., a sieve having square openings of 0.045 mm on a side) during a normal sieving operation. Zinc dust capable of passing through a 325 mesh sieve can have a mean average particle size from about 1 to 35 microns (for example, about 35 microns). The percentage of zinc dust can make up about 10 percent, 25 percent, 50 percent, 75 percent, 80 percent, 90 percent, 95 percent, 99 percent or 100 percent by weight of the total zinc-based particles. Even very small amounts of zinc fines, for example, at least about 5 weight percent, or at least about 1 weight percent of the total zinc-based particles can have a beneficial effect on anode performance. The total zinc-based particles in the anode can consist of only zinc fines, of no zinc fines, or mixtures of zinc fines and dust (e.g., from about 35 to about 75 weight percent) with larger size (e.g., −20 to +200 mesh) zinc-based particles. A mixture of zinc-based particles can provide good overall performance with respect to rate capability of the anode for a broad spectrum of drain rate requirements as well as provide good storage characteristics. To improve performance at high discharge rates after storage, a substantial percentage of zinc fines and/or zinc dust can be included in the anode.

High rate anodes that deliver the maximum battery service can be constructed from slurries formulated with high concentrations of zinc particles. The zinc particles can provide high surface area to deliver their capacity at a high rate while also sticking together to form conductive clusters. These clusters can provide electrolyte rich anode designs with relatively little loss in zinc connectivity. The fine zinc can be formulated with metal alloys (e.g, indium and bismuth 100-200 ppm by zinc weight), platings (e.g., indium 50-200 ppm by zinc weight) and organic corrosion inhibitors (e.g., RM510-dinonylphenol, polyoxyethylene phosphate ester 50 ppm by zinc weight) to control hydrogen gas generation that can occur when zinc is in contact with water. The zinc can be suspended in the electrolyte to provide easy manufacturing and a stable column of pores in the completed anode. In some embodiments, a high molecular weight polyacrylic acid polymer that is lightly crosslinked (e.g., BF.Goodrich C940@1.4-1.6% by weight in the electrolyte) can provide a network to hold the heavy zinc particles in place in the battery electrolyte.

Examples of gelling agents include polyacrylic acids, grafted starch materials, salts of polyacrylic acids, polyacrylates, carboxymethylcellulose or combinations thereof. Examples of polyacrylic acids are Carbopol™ 940 and 934 (available from B.F. Goodrich) and Polygel™ 4P (available from 3V), and an example of a grafted starch material is Waterlock™ A221 (available from Grain Processing Corporation, Muscatine, Iowa). An example of a salt of a polyacrylic acid is Alcosorb™ G1 (available from Ciba Specialties). The anode may include, for example, from 0.1 percent to about 1 percent gelling agent by weight.

Gassing inhibitors can be inorganic materials, such as bismuth, tin, lead and indium included in the zinc-based alloys or soluble compounds, such as indium acetate, indium hydroxide, indium sulfate, bismuth oxide, and barium hydroxide, included in the anode. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

In some embodiments, the molar ratio of the cathode active material to the anode active material is at least one (e.g., at least 0.5, at least 0.7, at least 0.9, or at least 1.1) and/or at most 1.3 (e.g., at most 1.4, at most 1.3, at most 1.2, or at most 1.1).

The electrolyte can be any of the electrolytes used in batteries. In some embodiments, cathode 12 can include from about 5% to about 8% (e.g., from about 6% to about 7%) electrolyte by weight. The electrolyte can be aqueous or non-aqueous. An aqueous electrolyte can be an alkaline solution, such as an aqueous hydroxide solution (e.g., LiOH, NaOH, KOH), or a mixture of hydroxide solutions (e.g., NaOH/KOH). For example, the aqueous hydroxide solution can include from about 33% by weight to about 40% by weight of the hydroxide material, such as about 9N KOH (about 37% by weight KOH). In some embodiments, the electrolyte can also include up to about 4% by weight (e.g., about 2% by weight) of zinc oxide.

The electrolyte can include other additives. As an example, the electrolyte can include a soluble material (e.g., an aluminum material) that reduces (e.g., suppresses) the solubility of the cathode active material in the electrolyte. In certain embodiments, the electrolyte can include one or more of the following: aluminum hydroxide, aluminum oxide, alkali metal aluminates, aluminum metal, alkali metal halides, alkali metal carbonates, or mixtures thereof. Electrolyte additives are described, for example, in Eylem et al., U.S. Patent Application Publication No. US 2004/0175613 A1, published on Sep. 9, 2004, and entitled "Battery".

Housing 18 can be any housing commonly used in batteries. As shown, housing 18 is a cylindrical housing. However, housings with other shapes, such as prismatic housings, can be used. In some embodiments, housing 18 can be made of a metal or a metal alloy, such as nickel, nickel-plated steel (e.g., nickel-plated cold-rolled steel), stainless steel, aluminum-clad stainless steel, aluminum, or an aluminum alloy. In certain embodiments, housing 18 can be made of a plastic, such as polyvinyl chloride, polypropylene, a polysulfone, acrylonitrile butadiene styrene (ABS), or a polyamide.

In some embodiments, housing 18 can include an inner metal wall and an outer electrically non-conductive material such as heat-shrinkable plastic. Optionally, a layer of conductive material can be disposed between the inner wall and cathode 12. The layer may be disposed along the inner surface of the inner wall, along the circumference of cathode 12, or both. This conductive layer can be formed, for example, of a carbonaceous material (e.g., graphite). Such materials include, for example, LB1000 (Timcal), Eccocoat 257 (W.R. Grace & Co.), Electrodag 109 (Acheson Colloids Co.), Electrodag 112 (Acheson), Varniphite 5000 (Nippon), and EB0005 (Acheson). Methods of applying the conductive layer are disclosed, for example, in Canadian Patent No. 1,263,697.

Separator 16 can be formed of any of the standard separator materials used in electrochemical cells (e.g., alkaline cells). For example, separator 16 can be formed of polypropylene (e.g., non-woven polypropylene or microporous polypropylene), polyethylene, polytetrafluoroethylene, a polyamide (e.g., a nylon), a polysulfone, a polyvinyl chloride, or combinations thereof. In some embodiments, separator 16 can include a layer of cellophane combined with a layer of a non-woven material. The non-woven material can include, for example, polyvinyl alcohol and/or rayon.

Seal 22 can be made of, for example, a polymer (e.g., nylon).

Cap 24 can be made of, for example, a metal or a metal alloy, such as aluminum, nickel, titanium, or steel.

In some embodiments, battery 10 can include a hydrogen recombination catalyst to lower the amount of hydrogen gas that may be generated in the cell by anode 14 (e.g., when anode 14 includes zinc). Hydrogen recombination catalysts are described, for example, in Davis et al., U.S. Pat. No. 6,500,576, and in Kozawa, U.S. Pat. No. 3,893,870. Alternatively or additionally, battery 10 can be constructed to include pressure-activated valves or vents, such as those described in Tomantschger et al., U.S. Pat. No. 5,300,371.

Weight percentages of battery components provided herein are determined according to design specifications, prior to assembly of the battery.

A cell (e.g., a cylindrical cell) can be prepared by, for example, rolling an anode, separator, and cathode together, and placing them in a housing. The housing (containing the anode, the cathode, and the separator) can then be filled with the electrolytic solution and subsequently hermetically sealed with, for example, a cap and annular insulating gasket.

In some embodiments, the cathode active material is assembled into a AA cell with an internal volume of 6.27 milliliters. An oxidation resistant carbon coating formulated with Timcal SFG-15 graphite can be used to establish good electrical contact between the cathode and the nickel plated steel battery container. The cathode formulation can include 81.5% nickel oxyhydroxide, 8% Timcal SFG-15 graphite, 6.0% 7N solution of potassium hydroxide, 1% Coathylene™ polyethylene binder (Dupont), and 3.5% moisture in the nickel oxyhydroxide. A separator can be used to restrict communication between the electrodes to ionic conduction and can include a cellophane/non-woven laminate or a ultra high molecular weight microporous polyethylene film (e.g., Solupor™ from DSM Solutech). The anode can be specifically designed to sustain high battery drain rates. For example, the anode can include zinc dust particles dispersed in a gelled battery electrolyte (6-8.5N potassium hydroxide or sodium hydroxide). The zinc dust can include zinc particles that can pass through a standard 325 mesh screen with an hole size of 45 microns. The zinc dust can be suspended in a high molecular weight polyacrylic acid polymer that is lightly crosslinked (e.g., BF.Goodrich C940@1.4-1.6% by weight in the electrolyte) providing a network to hold the heavy zinc particles in place in the battery electrolyte. The cell can be topped off with battery electrolyte to ensure that all pores are filled and the materials are fully utilized during discharge.

Battery 10 can be a primary electrochemical cell or a secondary electrochemical cell. Primary batteries are meant to be discharged (e.g., to exhaustion) only once, and then discarded. In other words, primary batteries are not intended to be recharged. Primary batteries are described, for example, in David Linden, *Handbook of Batteries* (McGraw-Hill, 2d ed. 1995). In contrast, secondary batteries can be recharged for many times (e.g., more than fifty times, more than a hundred times, or more). In some cases, secondary batteries can include relatively robust separators, such as those having many layers and/or that are relatively thick. Secondary batteries can also be designed to accommodate for changes, such as swelling, that can occur in the batteries. Secondary batteries are described, for example, in Falk & Salkind, "Alkaline Storage Batteries", John Wiley & Sons, Inc. 1969, and DeVirloy et al., U.S. Pat. No. 345,124.

Battery 10 can be of any of a number of different voltages (e.g., 1.5V), and/or can be, for example, a AA, AAA, AAAA, C, or D battery. While battery 10 is cylindrical, in some embodiments, a battery can be non-cylindrical. For example, a battery can be a coin cell, a button cell, a wafer cell, or a racetrack-shaped cell. In some embodiments, a battery can be prismatic. In certain embodiments, a battery can have a rigid laminar cell configuration or a flexible pouch, envelope or bag cell configuration. In some embodiments, a battery can have a spirally wound configuration, or a flat plate configuration. Batteries are described, for example, in Batson et al., U.S. Pat. No. 6,001,504; Berkowitz et al., U.S. patent application Ser. No. 10/675,512, filed on Sep. 30, 2003, and entitled "Batteries"; and Durkot et al., U.S. Patent Application Publication No. US 2004/0237293 A1, published on Dec. 2, 2004, and entitled "Alkaline Cell With Flat Housing and Nickel Oxyhydroxide Cathode".

EXAMPLES

The following examples are intended to be illustrative and not to be limiting.

Example 1

Synthesis of Non-Uniformly CoOOH-Coated NiOOH Particles

To a 10 L reactor was added eight liters of deionized water. The reactor was heated to 40° C. using a water jacket. One kilogram (10.79 moles) of $Ni(OH)_2$ was added to the reactor, the reactor was agitated at a constant speed. 105.2 grams (0.37 mole) of $CoSO_4$ was added to the reaction mixture, which was mixed for about ten minutes. 2318.4 grams (9.82 moles) of sodium persulfate was added to the reaction mixture, which was mixed for about ten minutes. 881.2 grams (22.6 moles) of sodium hydroxide was slowly added to the reaction mixture according to the addition schedule in Table 1. The reaction was cooled to 20° C. after addition of a first portion of 120 grams of sodium hydroxide. When the entire quantity of sodium hydroxide was added to the mixture, the reaction mixture was heated to 55° C., and the reaction was mixed for 24 hours.

TABLE 1

Sodium hydroxide addition schedule

| Time minutes | Addition (grams) | Cumulative Weight (grams) |
| --- | --- | --- |
| 0 | 20 | 0 |
| 10 | 20 | 20 |
| 20 | 20 | 40 |
| 30 | 20 | 60 |
| 40 | 20 | 80 |
| 50 | 20 | 100 |
| 60 | 120 | 120 |
| 90 | 120 | 240 |
| 120 | 120 | 360 |
| 150 | 120 | 480 |
| 180 | 120 | 600 |
| 210 | 120 | 720 |
| 240 | 41 | 840 |
| 240 | 41 (balance) | 881 |

The final product, non-uniformly CoOOH-coated NiOOH, was isolated by washing 4-5 times with about eight liters of fresh deionized water. During each wash the reactor is heated to 50° C. with stirring. The stirring is then turned off and the product is allowed to settle. The free liquid is carefully pumped out or decanted to leave a concentrated suspension. This process is repeated until a sample of the clarified wash liquid no longer produces a precipitate when 10% aqueous $BaCl_2$ solution is added dropwise. The concentrated suspension is then pumped into a tray where it is carefully dried to 3-4.5% moisture by weight in a oven at 60° C. ("standard drying procedure").

Figure 2:
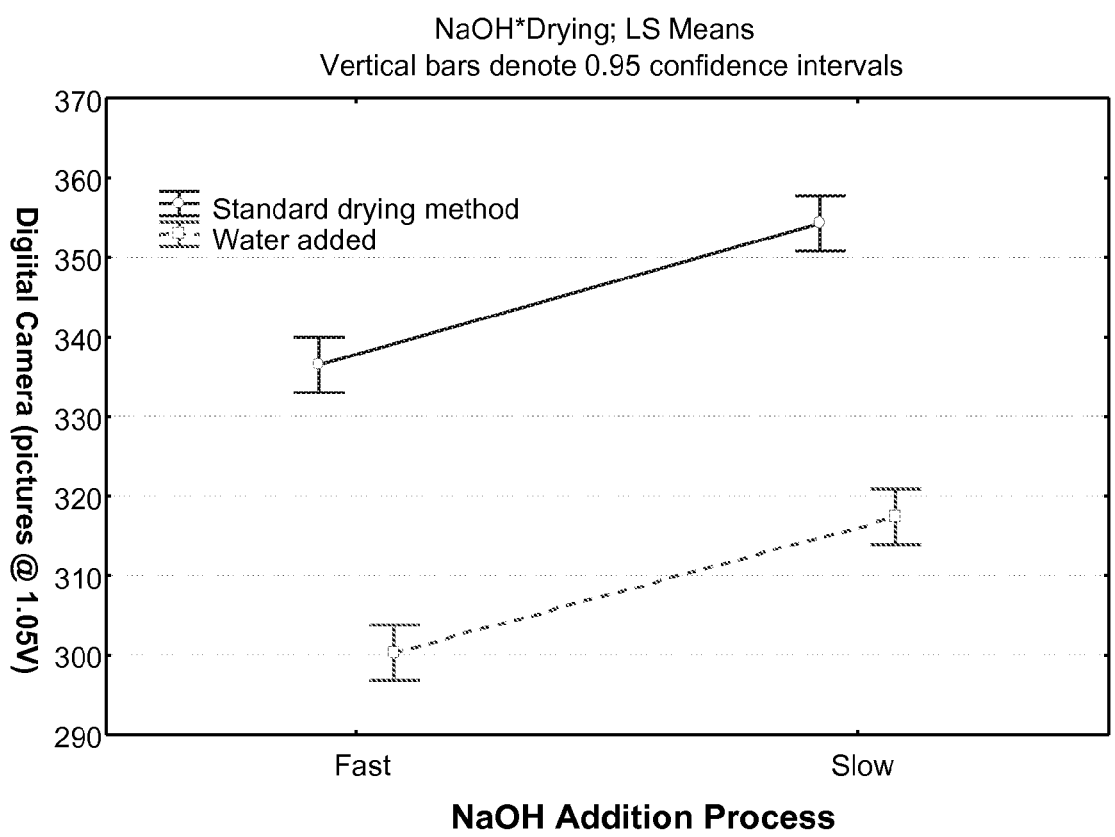
FIG. 2 is a graph showing a correlation of performance for embodiments of cathode active materials dried at 60° C. to 3-5% moisture level by weight or rehydrated to 3-5% moisture level by weight.

As shown in FIG. 2, correlations between the number of digital camera flashes and drying method for both a fast and slow addition of NaOH are shown. The solid line represents a digital camera performance for a non-uniformly CoOOH-coated NiOOH, dried drying at 60° C. to about 3-5% moisture by weight. The dashed line ("water added") represents a non-uniformly CoOOH-coated NiOOH that was fully dried, then rehydrated by adding water, followed by drying to about 3-5% moisture level by weight. As shown in FIG. 2, the re-wetted sample had a lower digital camera performance compared to the sample dried using the standard drying procedure. Therefore, the negative impact of over drying could not be reversed by simply re-wetting the sample followed by careful drying to the target moisture.

Example 2

Cathode Material Efficiency

Non-uniformly CoOOH-coated NiOOH particles were synthesized broadly in accordance with the procedure of Example 1, but with different ratios of the reactants. Sodium hydroxide was added either at a fast rate or at a slow rate. Referring to Table 2, during fast addition, sodium hydroxide was added in three portions over 20 minutes total: 45% of the sodium hydroxide was first added followed by waiting for 10 minutes, an additional 45% was then added followed by waiting for 10 minutes, and the remaining 10% was then added. During slow addition, the sodium hydroxide addition was added over four hours according to the schedule in Table 1. Std refers to the standard drying method of Example 1 to a target moisture of 3-5%. "Water added" refers to the rehydration method described in Example 1, where the cathode active material is re-wetted with water and then carefully dried to about 3-5% moisture level.

The theoretical capacity is the total weight of pure nickel oxyhydroxide in the battery multiplied by the intrinsic electrochemical equivalent capacity (@1-electron=0.292 ahrs/g). This intrinsic electrochemical equivalent capacity is arrived at by multiplying Faraday's number 96485 amp-sec/mole or 26.8 amp-hrs/mole times the number of electrons exchanged divided by the gram equivalent weight (grams) of nickel oxyhydroxide. The actual capacity is calculated by integrating the applied current over the interval of time required to reach a termination voltage of 1.05 volts (in the case of digital camera simulated test. Percent utilization is computed by dividing the actual capacity by the theoretical capacity. The particles and their respective percent utilizations are listed below in Table 2.

TABLE 2

CoOOH-coated NiOOH particles

| Cell chemistry | NaOH addition speed | Drying method | Precursor particle composition | Cobalt coating wt percent | Theoretical capacity | Actual capacity | Percent Utilization |
| --- | --- | --- | --- | --- | --- | --- | --- |
| NiOOH/Zn | Fast | Std | 1.4% Co/2.9% Zn | 0.47 | 2.23 | 1.23 | 55.3 |
| NiOOH/Zn | Fast | Std | 1.4% Co/2.9% Zn | 1.84 | 2.12 | 1.44 | 67.9 |
| NiOOH/Zn | Fast | Std | 1.4% Co/2.9% Zn | 2.45 | 2.11 | 1.26 | 59.7 |
| NiOOH/Zn | Fast | Std | 1.4% Co/2.9% Zn | Target 1.8% | 2.04 | 1.35 | 66.2 |
| NiOOH/Zn | Fast | Std | 1.4% Co/2.9% Zn | Target 1.8% | 2.04 | 1.37 | 67.2 |
| NiOOH/Zn | Slow | Std | 1.4% Co/2.9% Zn | Target 1.8% | 2.04 | 1.41 | 69.1 |
| NiOOH/Zn | Slow | Std | 1.4% Co/2.9% Zn | Target 1.8% | 2.04 | 1.42 | 69.6 |
| NiOOH/Zn | Fast | Water added | 1.4% Co/2.9% Zn | Target 1.8% | 2.04 | 1.28 | 62.7 |
| NiOOH/Zn | Fast | Water added | 1.4% Co/2.9% Zn | Target 1.8% | 2.04 | 1.20 | 58.8 |
| NiOOH/Zn | Slow | Water added | 1.4% Co/2.9% Zn | Target 1.8% | 2.04 | 1.28 | 62.7 |
| NiOOH/Zn | Slow | Water added | 1.4% Co/2.9% Zn | Target 1.8% | 2.04 | 1.33 | 65.2 |
| NiOOH/Zn | Fast | Std | 1.4% Co/0.0% Zn | Target 1.8% | 2.25 | 1.56 | 69.3 |
| EMD/Zn | | | EMD | EMD | 2.94 | 0.64 | 21.8 |

Example 3

Moisture Content of Coated Cathode Active Materials

Figure 3:
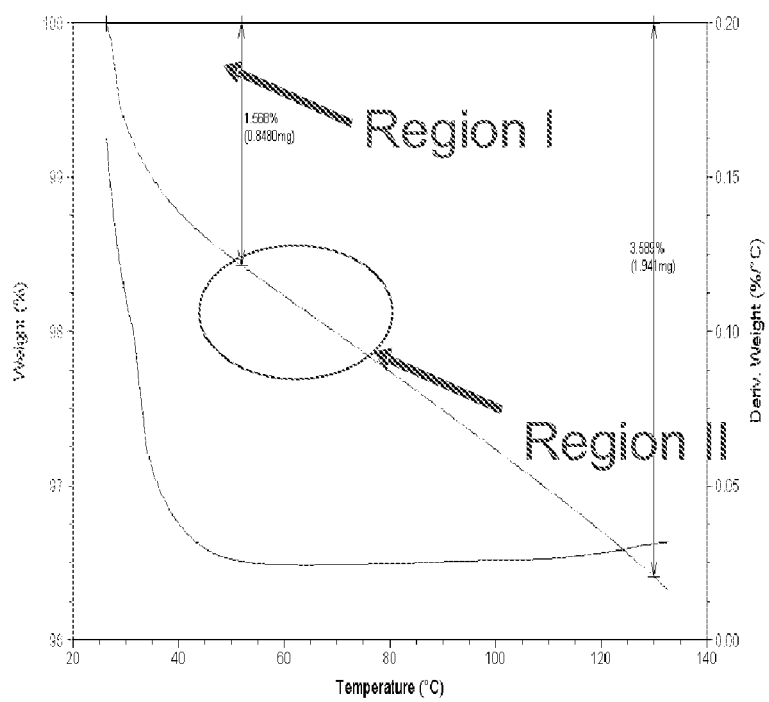
FIG. 3 is a graph showing a thermal gravimetric analysis of embodiments of a cathode active material.

The moisture content of four samples of particles of NiOOH having a non-uniform coating of CoOOH was assessed by thermal gravimetric analysis. A thermogravimetric analyzer (SDT Q600 thermogravimetric analyzer) was used to create the weight loss profiles. 50 milligrams of material was weighed into an aluminum pan and heated at rate of 10° C./min to the final test temperature of 15° C. The weight loss was continuously recorded during the heat-up to observe any change in the rate of weight loss with temperature. As shown in FIG. 3, two distinct regions in the material drying curves were observed. The first region showed water loss at a temperature of between 25-50° C., likely from the surface of the particles, and the second region showed water loss at a temperature of 50-120° C., likely from the interior of the particles. The percentage of water evaporated at the two regions and the total water content of the samples are shown in Table 3.

TABLE 3

Water content in non-uniformly CoOOH-coated NiOOH.

| Total water content | Water content in region 1 (25-50° C.) | Water content in region 2 (50-120° C.) |
|---|---|---|
| 1.9% | 0.6% | 1.3% |
| 3.6% | 1.6% | 2.0% |
| 5.7% | 3.5% | 2.2% |
| 6.2% | 4.4% | 1.8% |

Figure 4:
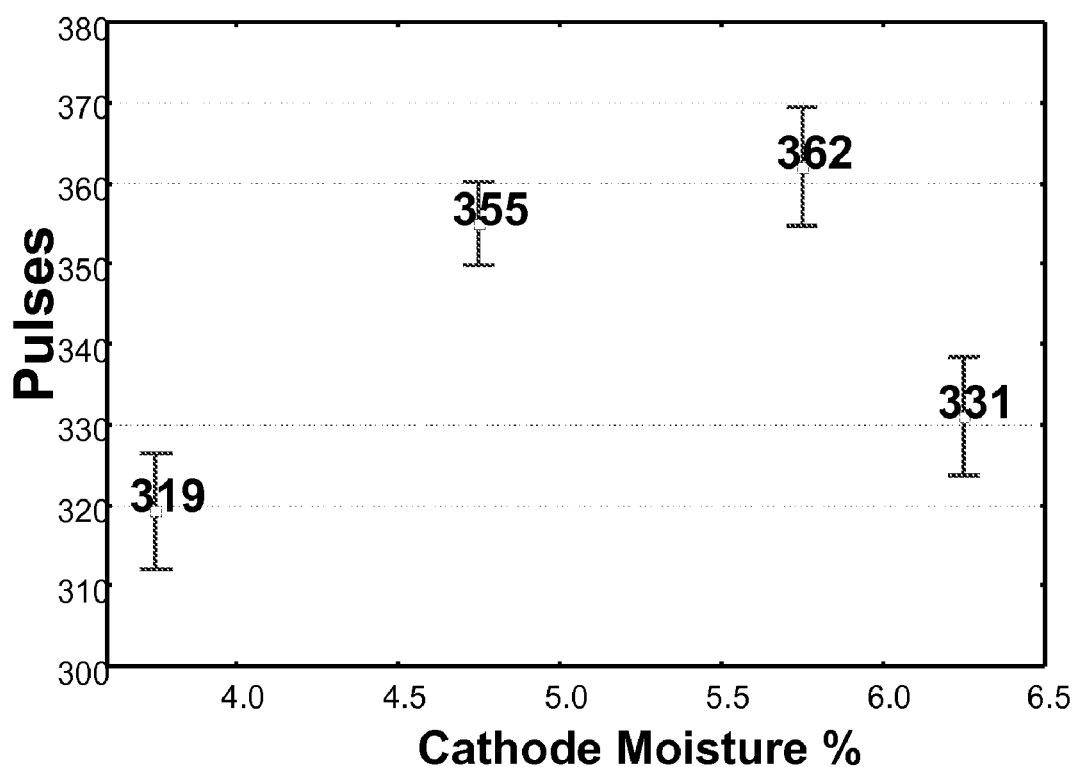
FIG. 4 is a graph showing a correlation of performance to moisture content of embodiments of a cathode active material.
Figure 5:
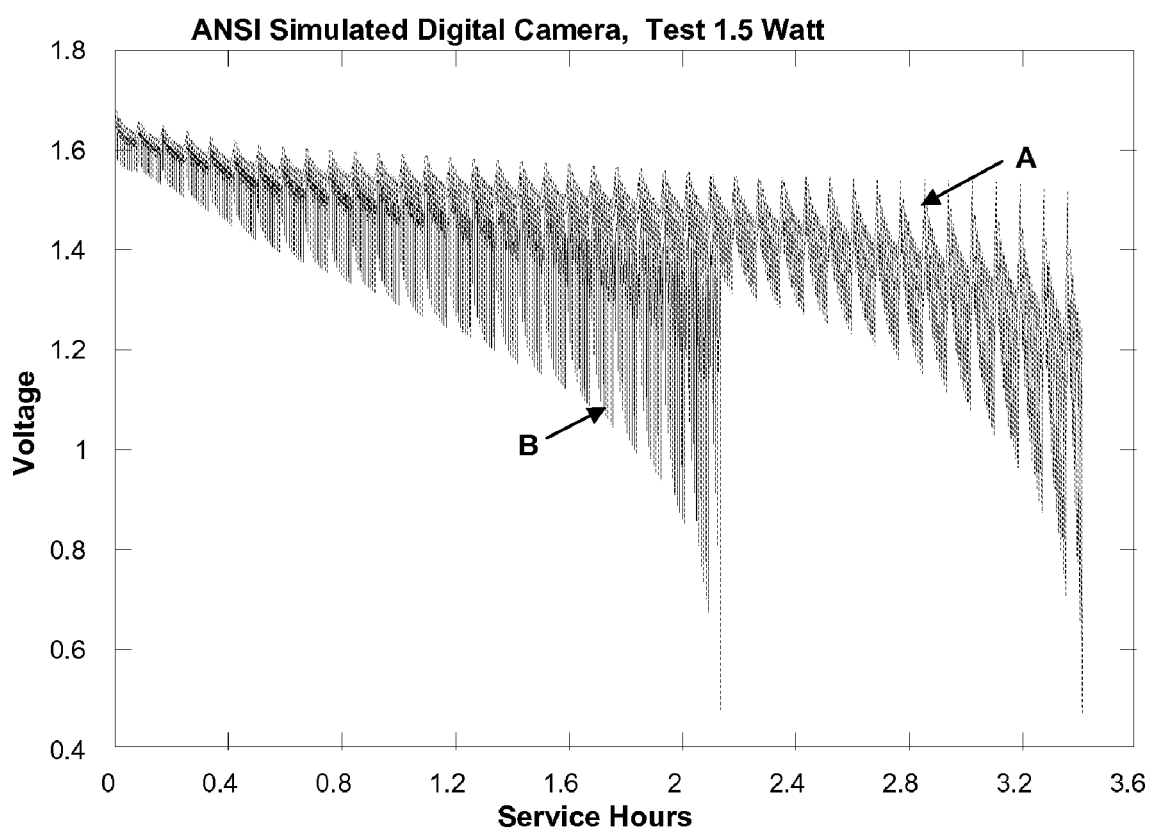
FIG. 5 is a graph showing a correlation between voltage and consumption (in service hours) of embodiments of a cathode active material.

Referring to FIG. 4, greater performance was observed at a moisture content of between 5-5.7% by weight, resulting in a 13.5% improvement in digital camera performance over a cathode active material having about 3.8% moisture by weight (319 pictures). Referring to FIG. 5, increased service hours was observed with batteries including a non-uniformly CoOOH-coated NiOOH (A) compared to batteries including uniformly CoOOH-coated NiOOH (B).

Example 4

Battery Assembly and Digital Camera Test

AA test cells with an internal volume of 6.27 milliliters were used to generate the experimental data. An oxidation resistant carbon coating formulated with Timcal SFG-15 graphite was used to establish good electrical contact between the cathode and the nickel plated steel battery container. The cathode formulation is 81.5% nickel oxyhydroxide, 8% Timcal SFG-15 graphite, 6.0% 7N solution of potassium hydroxide, 1% Coathylene™ polyethylene binder and 3.5% moisture in the nickel oxyhydroxide. A hollow cylindrical stack of 6 pellets was formed and placed in a steel can. Each pellet had a height of 7.2 mm, outer diameter of 13.3 mm, and an inner diameter of 8.9 mm. Each pellet was composed of 1.7 grams of the cathode mixture described above. A separator was used to restrict communication between the electrodes to ionic conduction. Several different materials were used such as a cellophane/non-woven laminate or an ultra high molecular weight microporous polyethylene film. In some test cells, the separator is Solupor™ from DSM Solutech. The anode is specifically designed to sustain high battery drain rates. The anode includes about 70% by weight of standard battery zinc particles that are highly enriched with fine zinc. The fine zinc was sized to pass through a standard 325 mesh screen with an hole size of 45 microns. The fine zinc is formulated with metal alloys (e.g., indium and bismuth 100-500 ppm by zinc weight), platings (e.g., indium 50-200 ppm by zinc weight), and organic corrosion inhibitors (e.g., RM510-dinonylphenol, polyoxyethylene phosphate ester 50 ppm by zinc weight) to control hydrogen gas generation that can occur when zinc is in contact with water. The total amount of zinc is combined with a gelled electrolyte at a level of 64% by weight. The suspending agent used is a high molecular weight polyacrylic acid polymer that is lightly crosslinked, e.g., BF.Goodrich C940 was used at 1.45% by weight in the electrolyte to hold the heavy zinc particles in place in the battery. The cell was also topped off with 0.6 grams battery electrolyte including 35.4% potassium hydroxide and 2% zinc oxide, to ensure that all pores are filled and the materials are fully utilized during discharge. When all battery active materials were assembled, a top with an integrated nylon seal was used to complete the assembly.

The discharge capacity of a battery cathode was measured by discharging the battery using a test that simulates consumer use with a digital camera. For the test, a 1500 mW load was applied to the battery for 2 seconds followed by a 650 mW load held for 28 seconds. This cycle was repeated 10 times or for a total of 5 minutes, then the battery was allowed to rest for 55 minutes (a 60 minute cycle). This 60 minute cycle was then repeated and continued until the battery load voltage first reached 1.05V. A Maccor 2300 battery test system was used to perform the consumer use simulation where 6-8 AA cells were tested for each experimental test group. The discharge capacity of the cathode was then calculated.

Example 5

CoOOH-Coated NiOOH Characterization

Four samples (A, B, C, and D) of CoOOH-coated NiOOH were synthesized broadly in accordance with the procedure of Example 1, but with different ratios of the reactants. Particles A, B, C, and D had a non-uniform coating having a average cobalt content of 0.55 weight percent, 1.95 weight percent, 2.37 weight percent, and 3.06 weight percent relative to the particles, respectively, as determined by inductively coupled plasma spectrometry. The plasma used was ignited from a combination of argon and nitrogen. 100 milligram samples of the nickel hydroxide were dissolved and serially diluted to a concentration that is appropriate for the equipment and standards used. The samples were evaluated and concentration of each analyzed, quantified and finally related back to the original sample by its dilution. The particles were assembled into batteries and a digital camera test was performed on the batteries using the procedure of Example 4. The results are listed in Table 4. A performance improvement of 63% to 105% was observed for the non-uniformly coated NiOOH, when compared with a fully-coated commercially available material.

TABLE 4

Characterization of CoOOH-coated NiOOH

| Base Particle | | | CoOOH Coating | | | |
|---|---|---|---|---|---|---|
| | | | | % | | |
| Cobalt | Zinc | Material | % coverage | Cobalt | Resistivity | Dcam |
| 0 | 0 | Commercial sample | 100 | 3.85 | 3.94 | 185 |
| 1.4 | 2.85 | A | 18.3 | 0.55 | 13.24 | 306 |
| 1.4 | 2.85 | B | 21.6 | 1.95 | 6.05 | 355 |
| 1.4 | 2.85 | C | 17.4 | 2.37 | 4.7 | 302 |
| 1.66 | 0 | D | 48.9 | 3.06 | 6.3 | 380 |

Figure 6A:
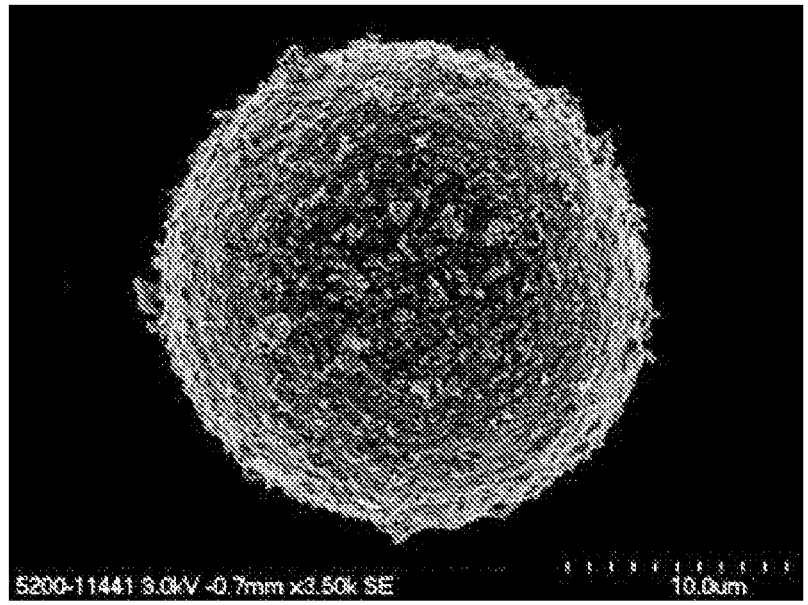
FIGS. 6A-6B are photographs of a commercially available cathode active material.
Figure 6B:
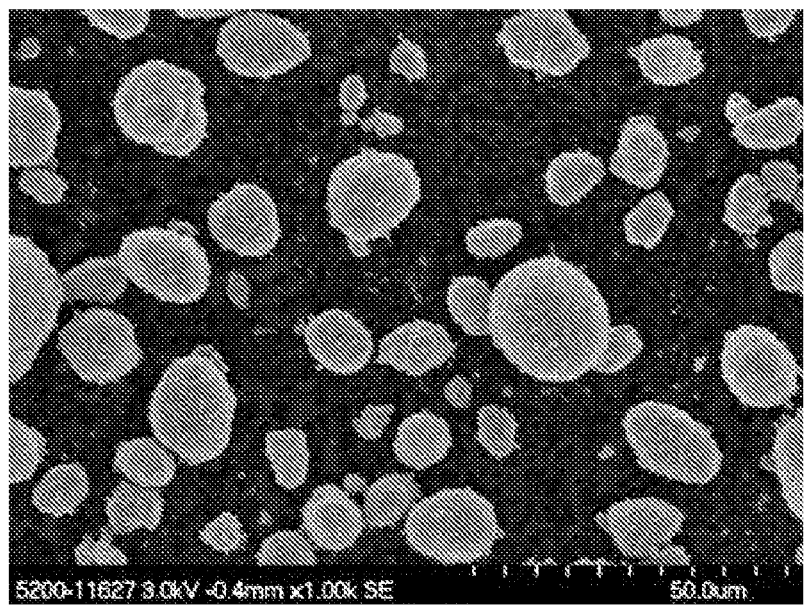
Figure 7A:
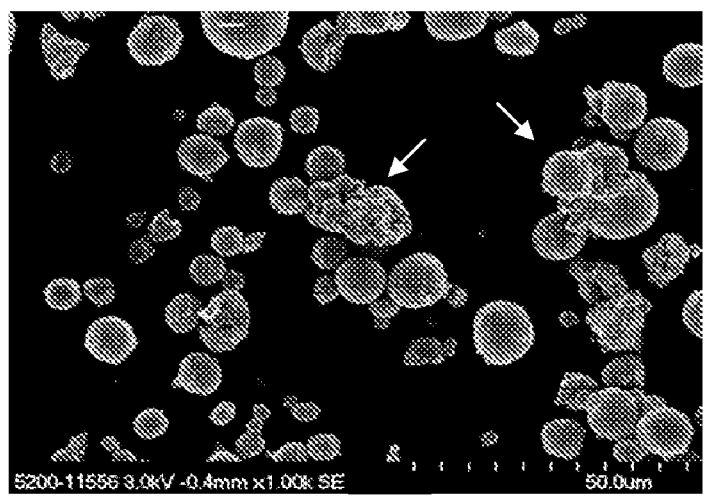
FIGS. 7A-7C are photographs of an embodiment of a cathode active material.
Figure 7B:
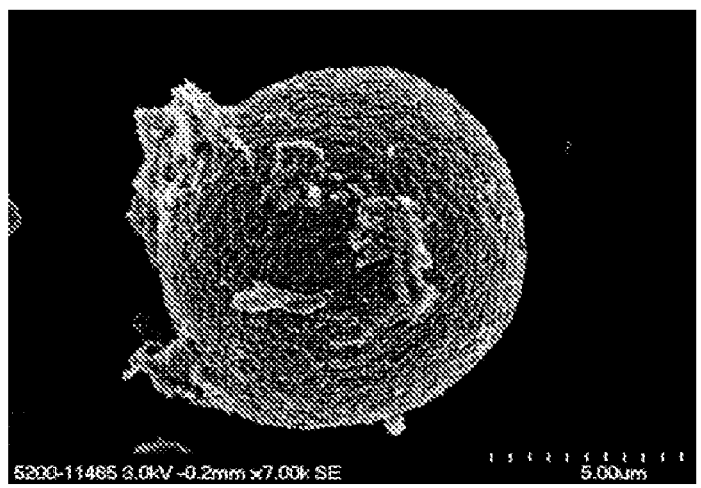
Figure 7C:
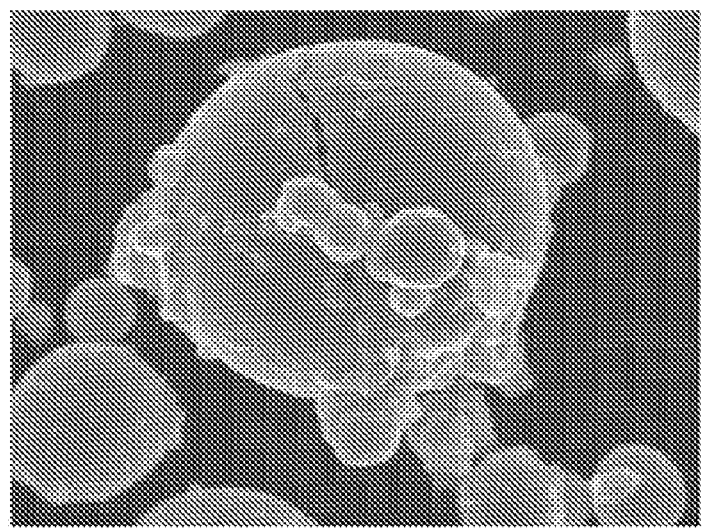
Figure 8A:
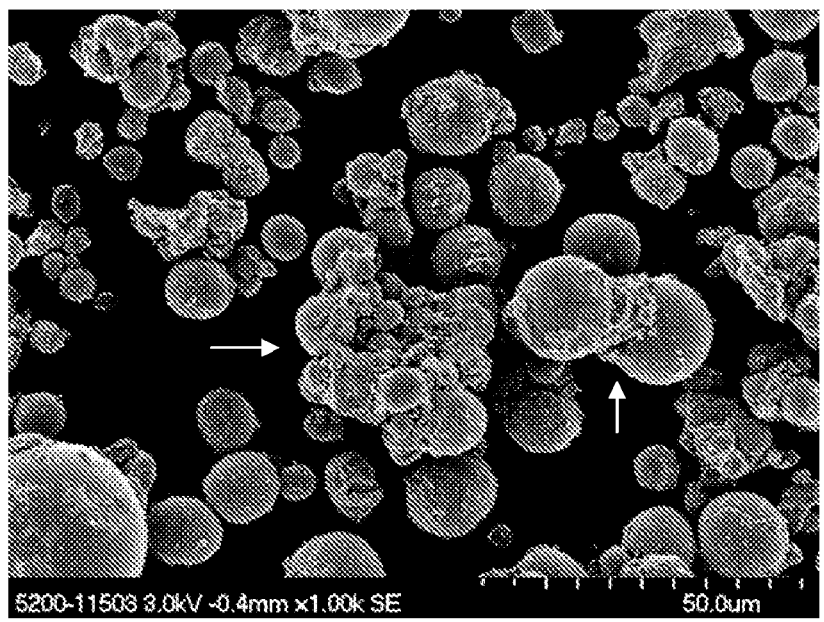
FIGS. 8A-8B are photographs of an embodiment of a cathode active material.
Figure 8B:
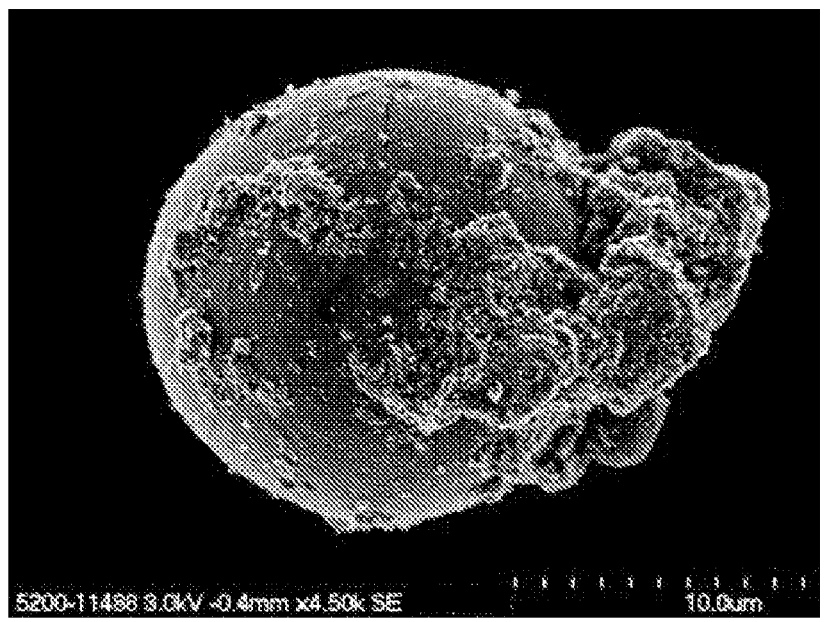
Figure 9A:
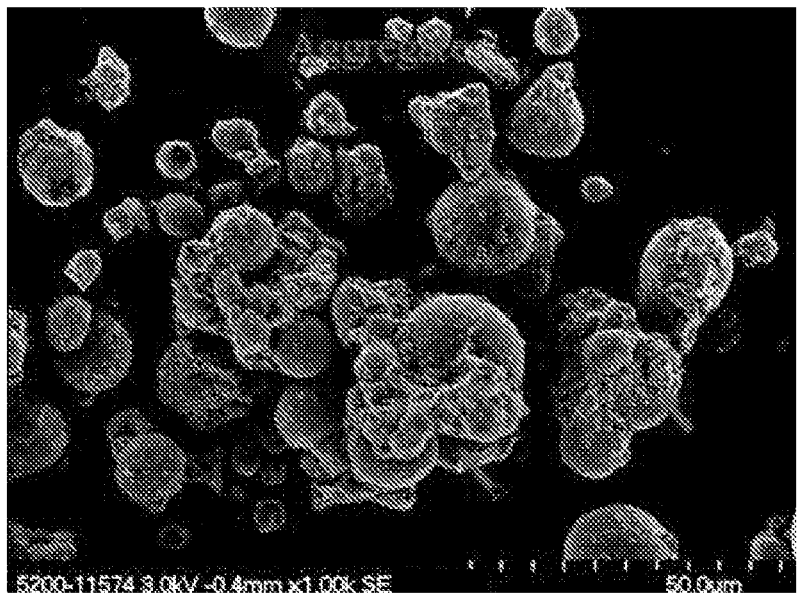
FIGS. 9A-9B are photographs of an embodiment of a cathode active material.
Figure 9B:
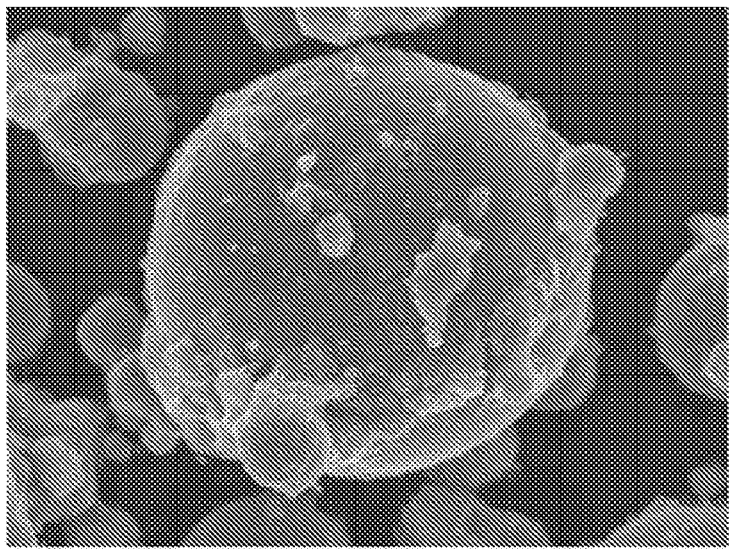
Figure 10A:
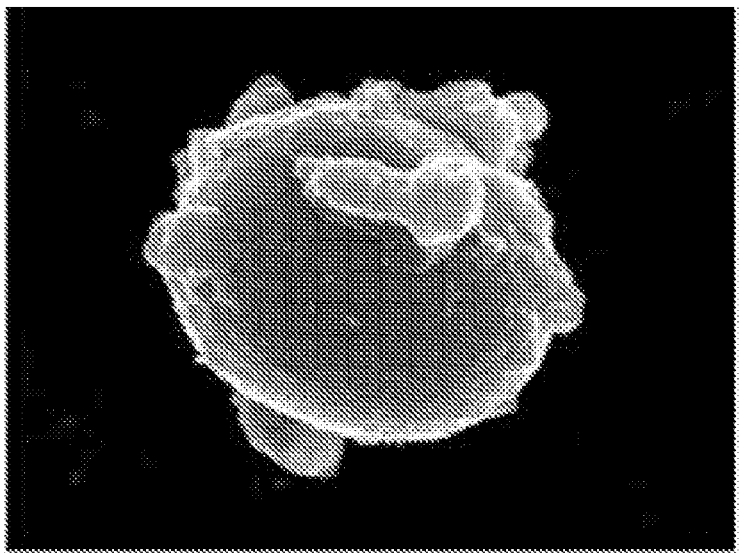
FIGS. 10A-10C are photographs of an embodiment of a cathode active material.
Figure 10B:
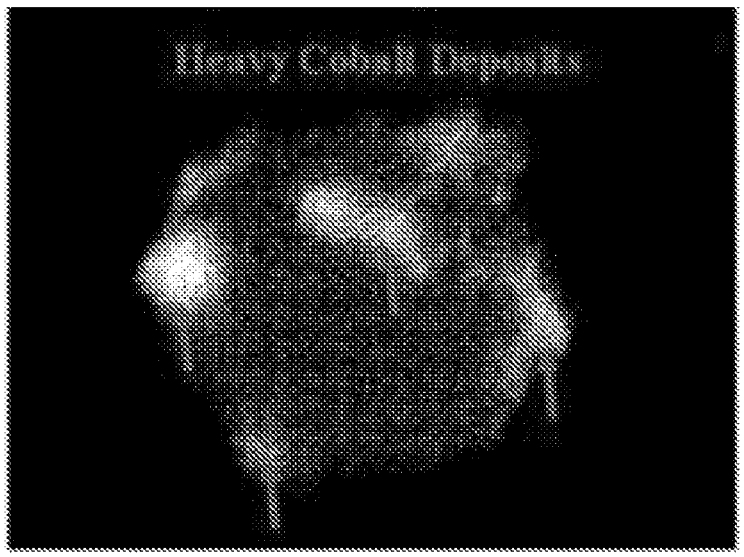
Figure 10C:
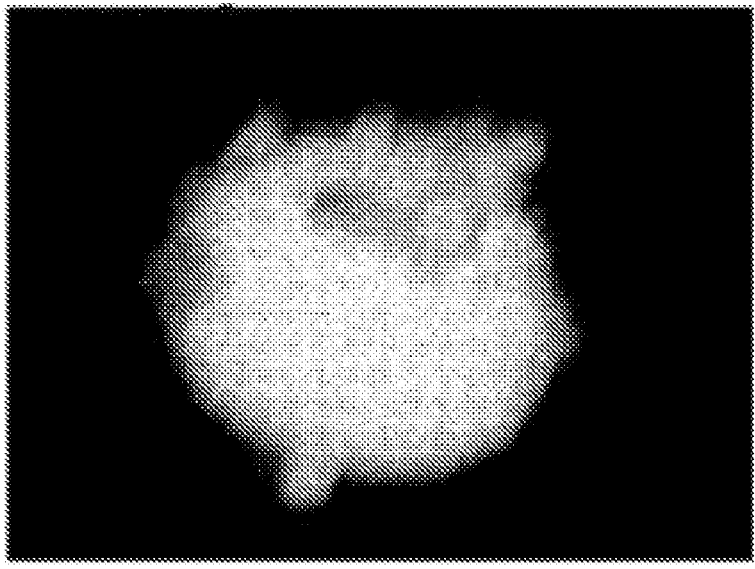

A commercially available fully coated NiOOH, and non-uniformly coated NiOOH samples A, B, and C, and D were imaged using an electron microscope. The commercially available fully coated NiOOH is shown in FIGS. 6A and 6B. The coated NiOOH was generally dispersed, and was uniformly coated. As shown in FIGS. 7A-7C, sample A had agglomerated clusters shown by the arrows in FIG. 7A, and the particles had protrusions of CoOOH coatings (FIGS. 7B and 7C). Referring to FIGS. 8A-8B, sample B had agglomerated clusters shown by the arrows in FIG. 8A, and the particles had protrusions of CoOOH coatings (FIG. 8B). Referring to FIGS. 9A-9B, sample C also had agglomerated clusters shown by the arrows in FIG. 9A, and the particles had protrusions of CoOOH coatings (FIG. 9B). Referring now to FIGS. 10A-10C, sample D had protruding CoOOH coatings as shown by FIG. 10A. A Co (FIG. 10B) mapping showed Co deposits at the protrusions (white areas), and a Ni mapping (FIG. 10C) showed uncoated surfaces on the particle having Ni (bright white areas). Samples A, B, C, and D were therefore non-uniformly coated.

Figure 11:
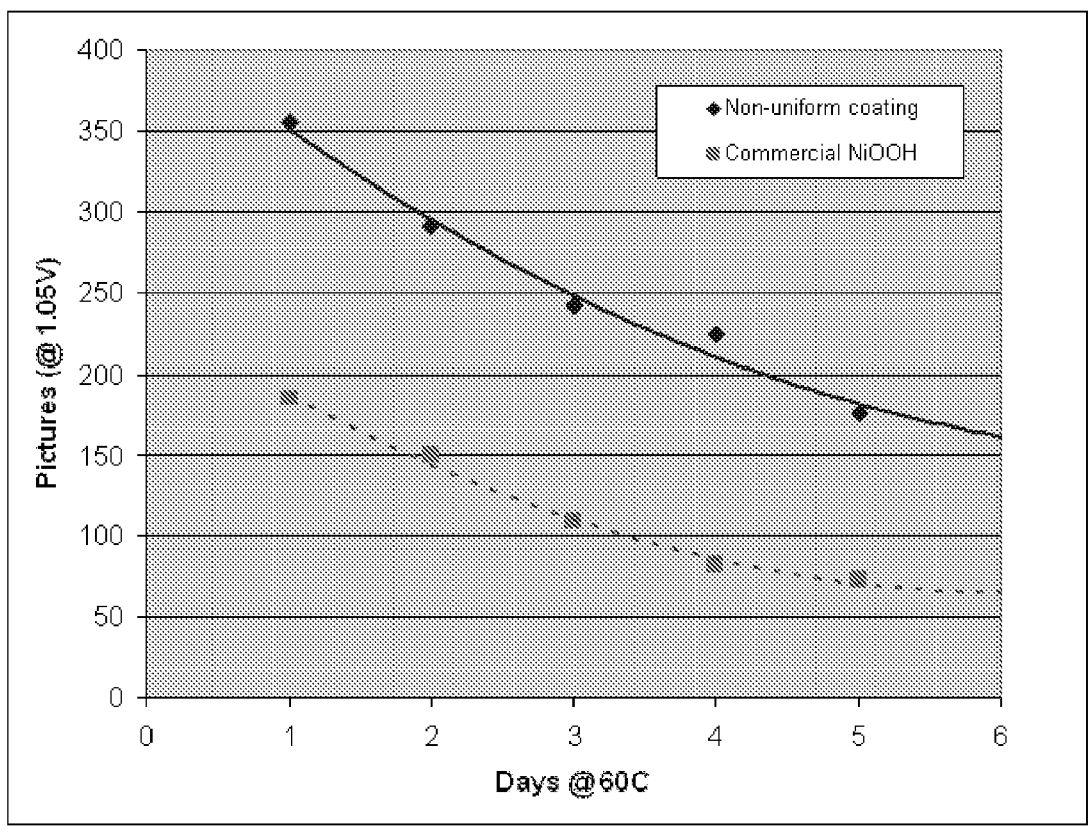
FIG. 11 is a graph showing a correlation between digital camera performance and days of storage at 60° C. for embodiments of a cathode active material.

Sample B and the commercial sample were subjected to storage at 60° C., and a digital camera test was performed on the samples. Referring to FIG. 11, the non-uniformly CoOOH-coated NiOOH retained a superior performance than the uniformly coated commercial sample even with exposure to high temperature storage over at least six days.

Figure 12:
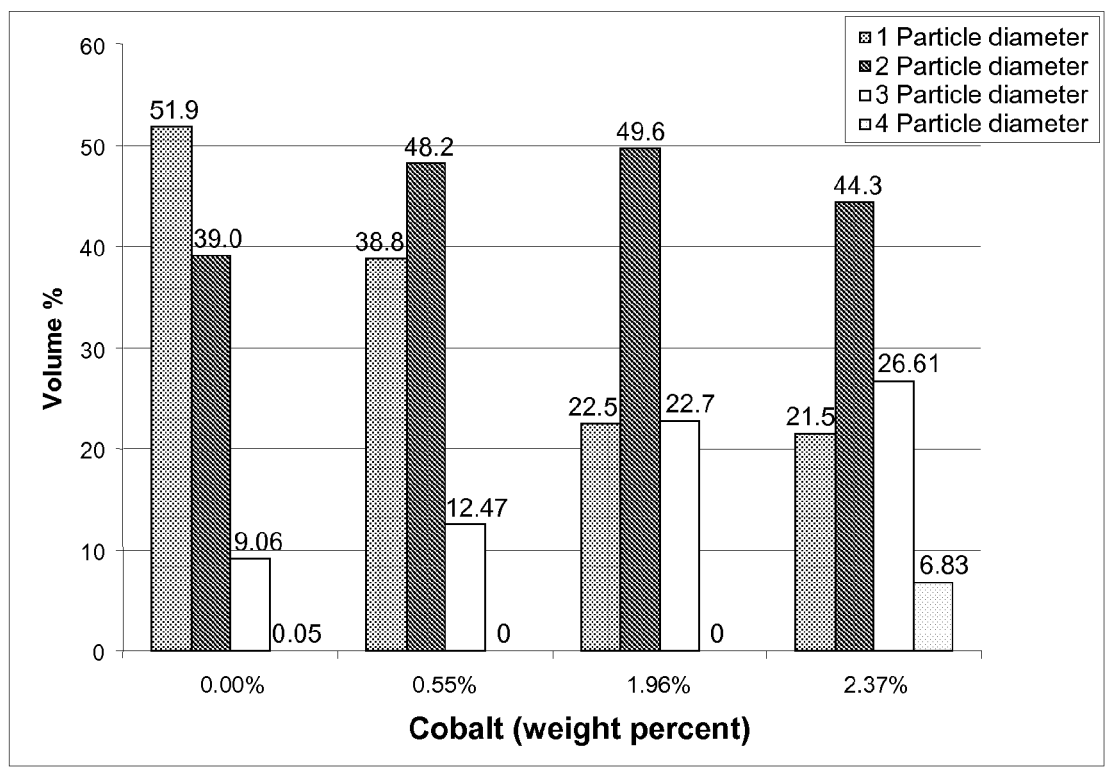
FIG. 12 is a bar graph showing percent size distributions for populations of embodiments of a cathode active material.

The particle size distributions of samples A, B, and C were analyzed using a Sympatec laser diffraction particle size analyzer (available from Sympatec GmbH). During measurement, an amount of particles was added to a solution to provide a suspension, and the particle concentration was adjusted such that about 20% of a laser light is blocked from a detector in the particle size analyzer. Using light scattering techniques, the average size distribution of the particle or particle clusters was determined. Referring to FIG. 12, at 0% by weight cobalt, a population of uncoated NiOOH particles had 51.9% of the population (by volume) having an average diameter of one particle diameter, 39.0% of the population having an average diameter of two particle diameters, 9.06 % of the population having an average diameter of three particle diameters, and 0.05% of the population having an average diameter of four particle diameters. As cobalt percentage increased due to the non-uniform CoOOH coating, the percentage of particle population having a greater average particle diameter increased due to formation of clusters. For example, at 0.55% Co by weight, 12.47% of the particle population had an average diameter of three particle diameters; at 1.96% Co by weight, 22.7% of the particle population had an average diameter of three particle diameters; and at 2.37% Co by weight, 26.61% of the particle population had an average diameter of three particle diameters. Similarly, as cobalt percentage increased due to the non-uniform CoOOH coating, the percentage of particle population having a small average particle diameter decreased as the small particles formed larger clusters. For example, at 0.55% Co by weight, 38.8% of the particle population had an average diameter of one particle diameter; at 1.96% Co by weight, 22.5% of the particle population had an average diameter of one particle diameter; and at 2.37% Co by weight, 21.5% of the particle population had an average diameter of one particle diameter.

Example 6

Figure 13:
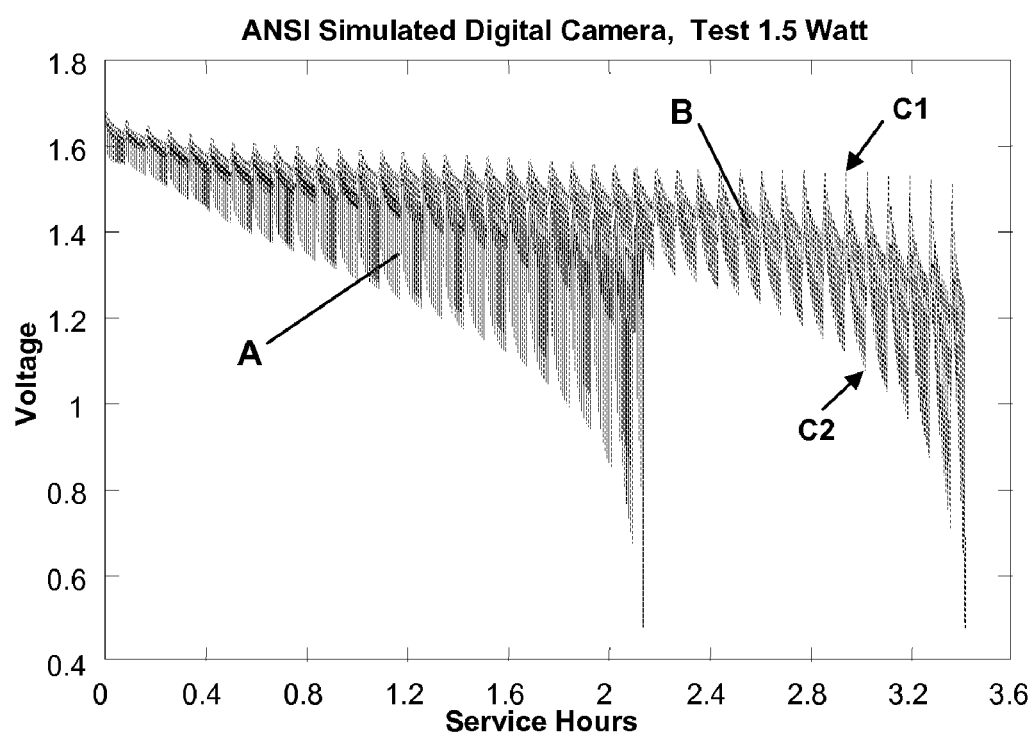
FIG. 13 is a graph showing a correlation between voltage and consumption (in service hours) of embodiments of a cathode active material.

Polarization Measurement of Non-Uniformly CoOOH-Coated NiOOH and Uniformly CoOOH-Coated NiOOH Batteries including a commercial uniformly CoOOH-coated NiOOH or a non-uniformly CoOOH-coated NiOOH were constructed according to the procedure in Example 4. Referring to FIG. 13, the polarization of a battery can be determined by comparing the voltage of the cell before the load is applied (e.g., C1) to the voltage at the instant load is applied (e.g., C2) during discharge, at each consumption point. As an example, in FIG. 13, the difference between C1 and C1 corresponds to the polarization of the battery at a consumption point of about 3 hours. The polarization of the two batteries can be calculated and compared at any consumption point. Referring to FIG. 13, at a similar degree of consumption of 2 hours, the polarization of the non-uniformly coated material (top curve B, corresponding to sample D of Table 4) was about ½ to ⅓ of the commercial uniformly CoOOH-coated NiOOH (bottom curve A). A reduction in polarization increased battery life.

Other Embodiments

While certain embodiments have been described, other embodiments are possible. For example, while CoOOH-coated NiOOH has been described, in some embodiments, the coating can also be applied to mixtures of active materials such as nickel oxyhydroxide and manganese dioxide or any other common battery cathode materials to form a conductive engineered cluster.

All references, such as patent applications, publications, and patents, referred to herein are incorporated by reference in their entirety.

Other embodiments are in the claims.

What is claimed is:

1. A battery comprising:
   a cathode comprising a cathode active material including a coated nickel oxyhydroxide having a coated surface area of at most 50 percent and a powder resistivity of at most 15 ohm and at least four ohm centimeters;
   an anode;
   a separator;
   and an electrolyte
   wherein the battery when discharged provides at least 250 pulses at 1.05V.

2. The battery of claim 1, wherein the coated nickel oxyhydroxide has an uncoated surface area of at least 50 percent.

3. The battery of claim 1, wherein the coated nickel oxyhydroxide has a moisture content of between 4 percent and 7 percent by weight.

4. The battery of claim 1, wherein the coated nickel oxyhydroxide has a moisture content of between 5 percent and 5.7 percent by weight.

5. The battery of claim 1, wherein the coated nickel oxyhydroxide is coated with cobalt oxyhydroxide.

6. The battery of claim 5, wherein the coated nickel oxyhydroxide has cobalt content of at most three percent by weight.

7. The battery of claim 1, wherein the cathode further comprises a cathode active material selected from the group consisting of manganese dioxide, silver oxide, silver nickelate, silver copper oxide, silver permanganate, barium permanganate, barium manganate, and barium ferrate.

8. The battery of claim 7, wherein the manganese dioxide is electrolytic manganese dioxide.

9. The battery of claim 1, wherein the battery is a AA battery.

10. The battery of claim 1, wherein the anode includes an anode active material, and a molar ratio of the cathode active material to the anode active material is at least one.

11. The battery of claim 1, wherein the anode comprises zinc.

12. A battery comprising: a cathode comprising a cathode active material including a coated nickel oxyhydroxide having a coated surface area of at most 50 percent, a powder resistivity of at most 15 ohm at least four ohm centimeters, and a high rate discharge efficiency of between 59% and 69.6%; an anode; a separator; and an electrolyte.

13. A battery comprising:
a cathode comprising a cathode active material including a coated nickel oxyhydroxide having a coated surface area of at most 40 percent and a powder resistivity of at least four ohm centimeters;
an anode;
a separator; and
an electrolyte.

* * * * *

UNITED STATES PATENT AND TRADEMARK OFFICE
CERTIFICATE OF CORRECTION

PATENT NO. : 8,334,067 B2
APPLICATION NO. : 12/352625
DATED : December 18, 2012
INVENTOR(S) : Richard E. Durkot et al.

Page 1 of 1

It is certified that error appears in the above-identified patent and that said Letters Patent is hereby corrected as shown below:

First Page, col. 2, (Other Publications), Delete "Sperical" and insert --Spherical--, therefor.

Col. 21, line 9, in Claim 12, after "15 ohm", insert --and--.

Signed and Sealed this
Nineteenth Day of March, 2013

Teresa Stanek Rea
*Acting Director of the United States Patent and Trademark Office*